US012134275B2

(12) United States Patent
Ishigai et al.

(10) Patent No.: US 12,134,275 B2
(45) Date of Patent: Nov. 5, 2024

(54) INKJET RECORDING DEVICE

(71) Applicant: Konica Minolta, Inc., Tokyo (JP)

(72) Inventors: Takuya Ishigai, Hino (JP); Keishi Suzuki, Hino (JP); Takuya Okada, Hino (JP)

(73) Assignee: Konica Minolta, Inc., Tokyo (JP)

( * ) Notice: Subject to any disclaimer, the term of this patent is extended or adjusted under 35 U.S.C. 154(b) by 99 days.

(21) Appl. No.: 17/818,774

(22) Filed: Aug. 10, 2022

(65) Prior Publication Data

US 2023/0065145 A1 Mar. 2, 2023

(30) Foreign Application Priority Data

Aug. 30, 2021 (JP) ................................ 2021-139936

(51) Int. Cl.
*B41J 2/165* (2006.01)

(52) U.S. Cl.
CPC ....... *B41J 2/16552* (2013.01); *B41J 2/16541* (2013.01); *B41J 2002/16558* (2013.01)

(58) Field of Classification Search
CPC ................ B41J 2/16552; B41J 2/16541; B41J 2002/16558; B41J 19/142; B41J 2/2114
See application file for complete search history.

(56) References Cited

U.S. PATENT DOCUMENTS

2002/0071014 A1 6/2002 Matsumoto et al.
2019/0084329 A1 3/2019 Katagami et al.

FOREIGN PATENT DOCUMENTS

CN 108712967 A * 10/2018 .......... B41J 11/0015
WO 2003/043825 A1 5/2003

OTHER PUBLICATIONS

Katakami, Satoru et al. (CN 108712967 A), Printing Device. Oct. 26, 2018, Entire Document and Figs.8-11 (Year: 2018).*
European Patent Office, European Search Report dated Jan. 20, 2023 for the related European patent application No. 22192859.1, 7 pages.

* cited by examiner

*Primary Examiner* — Lisa Solomon
(74) *Attorney, Agent, or Firm* — LUCAS & MERCANTI, LLP

(57) ABSTRACT

An inkjet recording device includes: an inkjet unit that ejects ink to a recording medium while scanning in a main scanning direction; a first treatment liquid ejection head that is arranged side by side with the inkjet unit in the main scanning direction, scans together with the inkjet unit, and ejects a first treatment liquid to the recording medium; and a second treatment liquid ejection head that is arranged side by side with the inkjet unit in the main scanning direction, scans together with the inkjet unit, and ejects a second treatment liquid different from the first treatment liquid to the recording medium, wherein at least one of the first treatment liquid ejection head and the second treatment liquid ejection head is arranged on both sides of the inkjet unit in the main scanning direction.

17 Claims, 10 Drawing Sheets

INKJET RECORDING DEVICE

The entire disclosure of Japanese patent Application No. 2021-139936, filed on Aug. 30, 2021, is incorporated herein by reference in its entirety.

BACKGROUND

Technological Field

The present invention relates to an inkjet recording device, and especially relates to an inkjet recording device that forms an image by ejecting ink and a treatment liquid to a recording medium while allowing an inkjet unit to scan in a main scanning direction.

Description of the Related Art

A scanning type inkjet recording device is provided with an inkjet head that ejects ink while scanning in a main scanning direction. Conventionally, in an inkjet head that scans in a main scanning direction, an inkjet head in which a pre-treatment liquid head that ejects a pre-treatment liquid is provided on one side in the main scanning direction, and a post-treatment liquid head that ejects a post-treatment liquid is provided on the other side is known (for example, WO 03/043825 A). That is, in this conventional technology, the pre-treatment liquid head and the post-treatment liquid head are arranged in a state of interposing the inkjet head that ejects ink. The pre-treatment liquid is a liquid ejected to the recording medium before the ink is ejected. The post-treatment liquid is a liquid ejected to the recording medium after the ink is ejected.

As in the conventional technology mentioned above, in a case of a configuration in which the pre-treatment liquid head is provided only on one side of the inkjet head and a post-treatment liquid head is provided only on the other side of the inkjet head, the pre-treatment liquid, the ink, and the post-treatment liquid may be ejected in an appropriate order when the inkjet head moves in one direction (for example, forward direction) in the main scanning direction. That is, the pre-treatment liquid head may eject the pre-treatment liquid to the recording medium before ink ejection, the inkjet head may eject the ink to the recording medium to which the pre-treatment liquid is ejected, and the post-treatment liquid head may eject the post-treatment liquid to the recording medium to which the ink is ejected.

However, in the configuration as in the above-described conventional technology, when the inkjet head moves in a direction opposite to the main scanning direction (for example, backward direction), the pre-treatment liquid, the ink, and the post-treatment liquid cannot be ejected in the appropriate order. Therefore, in the conventional technology, it is necessary to reciprocate the inkjet head in the main scanning direction in order to form an image by one line corresponding to a print width of the inkjet head, and there is a problem that productivity is low.

In contrast, among the treatment liquids ejected to the recording medium separately from the ink, there are a liquid preferably ejected to the recording medium before the ink is ejected, a liquid preferably ejected to the recording medium after the ink is ejected, and a liquid that may be used before and after the ink is ejected.

SUMMARY

Therefore, the present invention has been achieved in order to solve the above-described conventional problems, and an object thereof is to provide an inkjet recording device capable of enhancing productivity by improving a conventional head configuration and enabling image formation on each of a forward path and a backward path in a main scanning direction.

To achieve the abovementioned object, according to an aspect of the present invention, an inkjet recording device reflecting one aspect of the present invention comprises: an inkjet unit that ejects ink to a recording medium while scanning in a main scanning direction; a first treatment liquid ejection head that is arranged side by side with the inkjet unit in the main scanning direction, scans together with the inkjet unit, and ejects a first treatment liquid to the recording medium; and a second treatment liquid ejection head that is arranged side by side with the inkjet unit in the main scanning direction, scans together with the inkjet unit, and ejects a second treatment liquid different from the first treatment liquid to the recording medium, wherein at least one of the first treatment liquid ejection head and the second treatment liquid ejection head is arranged on both sides of the inkjet unit in the main scanning direction.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
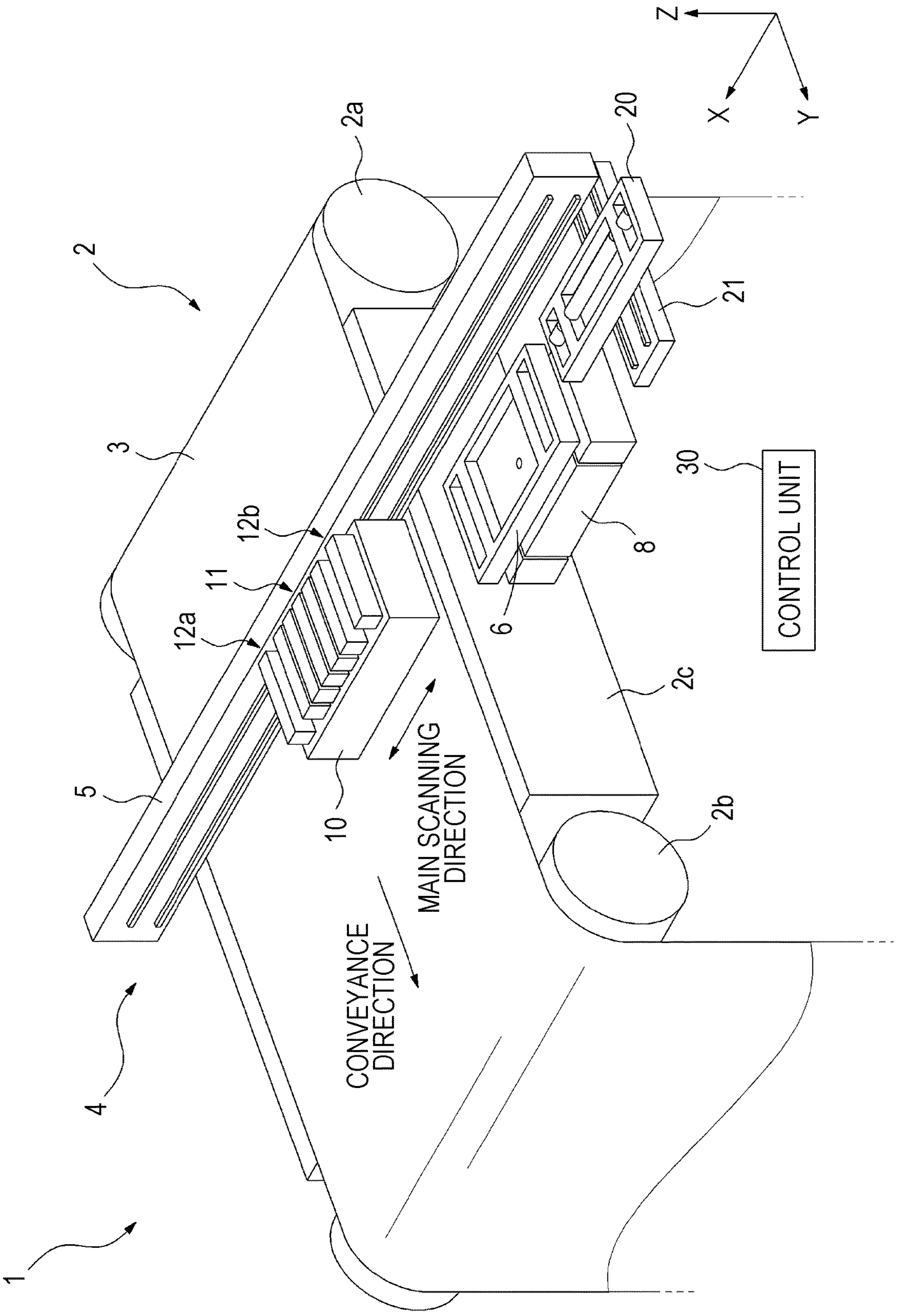
FIG. 1 is a view illustrating a schematic configuration of an inkjet recording device.

Hereinafter, one or more embodiments of the present invention will be described with reference to the drawings. However, the scope of the invention is not limited to the disclosed embodiments. Note that, in the embodiments described below, common elements are assigned with the same reference numeral, and the description thereof is not repeated.

First Embodiment

First, a first embodiment of the present invention is described. FIG. 1 is a view illustrating a schematic configuration of an inkjet recording device 1 being one embodiment of the present invention. An XYZ three-dimensional coordinate system illustrated in FIG. 1 is a coordinate system in which an XY plane is a horizontal plane and a Z direction is a vertical direction, the coordinate system common to coordinate systems illustrated in the other views. The inkjet recording device 1 is a printing device that forms an image by ejecting ink to a recording medium 3 conveyed in a predetermined conveyance direction. As illustrated in FIG. 1, the inkjet recording device 1 is provided with a conveyance unit 2 that conveys the recording medium 3, an image forming unit 4, and a control unit 30. For example, the recording medium 3 is formed of web-shaped fabric. However, there is no limitation, and the recording medium 3 may also be printing paper, a film and the like.

The conveyance unit 2 conveys a web-shaped or sheet-shaped recording medium 3 in a predetermined conveyance direction (Y direction in FIG. 1). The conveyance unit 2 is provided with a pair of conveyance rollers 2*a* and 2*b* and a platen 2*c*. The pair of conveyance rollers 2*a* and 2*b* rotates about a rotation axis parallel to an X direction in FIG. 1 by drive of a conveyance motor not illustrated. As a result, the recording medium 3 stretched between the pair of conveyance rollers 2*a* and 2*b* is conveyed in the conveyance direction (Y direction). The platen 2*c* is a plate-shaped member arranged between the pair of conveyance rollers 2*a* and 2*b* in such a manner that an upper surface thereof is substantially horizontal. The platen 2*c* supports the recording medium 3 by the upper surface thereof. It is also possible to configure to provide a vent hole on the platen 2*c* to suck air from a side opposite to the recording medium 3, thereby absorbing the recording medium 3 to the upper surface of the platen 2*c*. In this case, the recording medium 3 is conveyed in a predetermined conveyance direction in a state of being absorbed to the upper surface of the platen 2*c*. Note that, the configuration of the conveyance unit 2 is not limited to the above, and a configuration in which an endless conveyance belt is stretched between the pair of conveyance rollers 2*a* and 2*b*, and the recording medium 3 is conveyed in the conveyance direction by the conveyance belt that circulates to move according to the rotation of the conveyance rollers 2*a* and 2*b*, for example, is also possible.

The conveyance unit 2 intermittently conveys the recording medium 3 in the conveyance direction (Y direction). That is, the conveyance unit 2 stops a conveyance operation of the recording medium 3 after conveying the recording medium 3 by a predetermined amount in the conveyance direction. After an image of a predetermined width is formed on the recording medium 3 by the image forming unit 4, the conveyance unit 2 conveys the recording medium 3 again by a predetermined amount in the conveyance direction, and then stops the conveyance operation of the recording medium 3. In this manner, the conveyance unit 2 repeats the operation of stopping the conveyance after conveying the recording medium 3 by a predetermined amount in the conveyance direction.

The image forming unit 4 is arranged so as to cross a position above the recording medium 3 conveyed by the conveyance unit 2 in a direction (X direction) orthogonal to the conveyance direction (Y direction). The image forming unit 4 forms the image on the recording medium 3 by ejecting the ink to the recording medium 3 when the conveyance operation of the recording medium 3 by the conveyance unit 2 stops. The image forming unit 4 is provided with, for example, an inkjet unit 11 that ejects ink of four colors of yellow (Y), magenta (M), cyan (C), and black (K), and a carriage 10 that holds the inkjet unit 11. The carriage 10 is attached to a rail member 5 crossing over the recording medium 3, and reciprocates in an extending direction (X direction) of the rail member 5 by drive of a motor not illustrated. A moving direction (X direction) of the carriage 10 is a main scanning direction in which the inkjet unit 11 scans when the image is formed on the recording medium 3. That is, when the conveyance of the recording medium 3 stops, the image forming unit 4 forms the image by ejecting the ink from the inkjet unit 11 to the recording medium 3 while allowing the inkjet unit 11 to scan in the main scanning direction. At that time, the inkjet unit 11 ejects the ink to the recording medium 3 on the basis of image data to be printed. Therefore, when moving in the main scanning direction, the inkjet unit 11 ejects the ink to an image area including an effective image component in the image data to be printed, and does not eject the ink to a margin area not including the effective image component.

The inkjet unit 11 is provided at the center of the carriage 10 in the main scanning direction. The carriage 10 is provided with treatment liquid ejection heads 12*a* and 12*b* on both sides of the inkjet unit 11 in the main scanning direction. That is, in the main scanning direction, the treatment liquid ejection head 12*a* is arranged on one side of the inkjet unit 11, and the treatment liquid ejection head 12*b* is arranged on the other side. The treatment liquid ejection heads 12*a* and 12*b* are arranged side by side with the inkjet unit 11 in the main scanning direction of the carriage 10, and move in the main scanning direction together with the inkjet unit 11. The treatment liquid ejection heads 12*a* and 12*b* eject a predetermined treatment liquid to the recording medium 3 before or after the ink is ejected to the recording medium 3 by the inkjet unit 11.

At least one end of the rail member 5 provided on the image forming unit 4 extends further outward from a conveyance path on which the recording medium 3 is conveyed. Therefore, the carriage 10 is movable further outward from the conveyance path of the recording medium 3 where the rail member 5 extends. A purge tub 6 and a waste liquid tank 8 are provided on one end side on which the rail member 5 extends, and a cleaner 20 is further provided at a position adjacent to the purge tub 6 and the waste liquid tank 8. The purge tub 6 and the waste liquid tank 8 recover the ink and the treatment liquid purged and discharged from the inkjet unit 11 and the treatment liquid ejection heads 12*a* and 12*b*. The cleaner 20 cleans nozzles provided on an ink ejection surface of the inkjet unit 11 and treatment liquid ejection surfaces of the treatment liquid ejection heads 12*a* and 12*b*. The cleaner 20 is arranged on a rail member 21 arranged in a direction (Y direction) parallel to the conveyance direction of the recording medium 3, and is movable in the Y direction along the rail member 21.

The control unit 30 controls the operation of each unit described above. For example, when the image is formed on the recording medium 3, the control unit 30 intermittently conveys the recording medium 3 in the conveyance direction, and moves the carriage 10 forward or backward in the main scanning direction in a state in which the conveyance of the recording medium 3 is stopped. For example, when moving the carriage 10 forward, the control unit 30 drives the inkjet unit 11 to form an image by one line in the main scanning direction on the recording medium 3. At that time, an image width by one line formed on the recording medium 3 corresponds to a print width in the conveyance direction of the recording medium 3 in the inkjet unit 11. When the image by one line is formed, the control unit 30 intermittently conveys the recording medium 3 again. A conveyance amount of the recording medium 3 at that time corresponds to the image width by one line formed by the inkjet unit 11. When the recording medium 3 is conveyed by an amount of the image width by one line, the control unit 30 stops the conveyance of the recording medium 3 and moves the carriage 10 again in the main scanning direction. In a case where it is moved forward last time, it is moved backward this time in a direction opposite to that in last time. When moving the carriage 10 backward, the control unit 30 drives the inkjet unit 11 to form an image by one line in the main scanning direction on the recording medium 3. By repeatedly performing such an intermittent operation, the control unit 30 forms the image on the recording medium 3.

When cleaning the nozzles of the inkjet unit 11, the control unit 30 moves the carriage 10 to a position above the purge tub 6 or a position above the cleaner 20. When the carriage 10 is moved to the position above the purge tub 6, the control unit 30 drives the inkjet unit 11 and the treatment liquid ejection heads 12*a* and 12*b* to purge and discharge the ink and the treatment liquid from the nozzles. As a result, clogging of the nozzles may be prevented in advance. When the carriage 10 is moved to the position above the cleaner 20, the control unit 30 drives the cleaner 20 to move the cleaner 20 in the Y direction. As a result, the cleaner 20 may clean the nozzles of the inkjet unit 11 and the treatment liquid ejection heads 12*a* and 12*b*.

Figure 2:
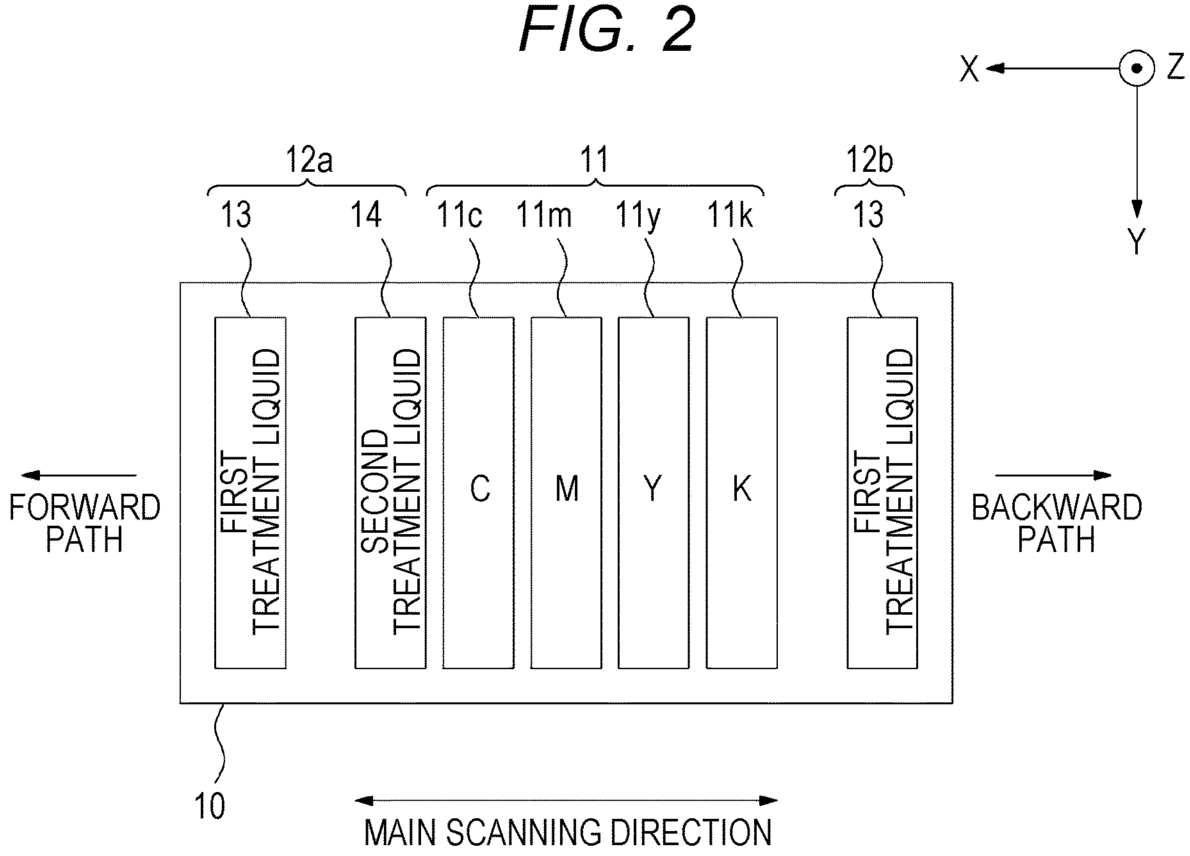
FIG. 2 is a planar view illustrating an inkjet unit and a treatment liquid ejection head mounted on a carriage.

Next, the inkjet unit 11 and the treatment liquid ejection heads 12*a* and 12*b* mounted on the carriage 10 will be described in detail. FIG. 2 is a planar view illustrating the inkjet unit 11 and the treatment liquid ejection heads 12*a* and 12*b* mounted on the carriage 10.

As illustrated in FIG. 2, the inkjet unit 11 is provided with a plurality of inkjet heads 11*c*, 11*m*, 11*y*, and 11*k* that ejects ink of four colors of Y, M, C, and K, respectively. The plurality of inkjet heads 11*c*, 11*m*, 11*y*, and 11*k* is arranged at predetermined intervals in the main scanning direction. Each of the inkjet heads 11*c*, 11*m*, 11*y*, and 11*k* is provided with a large number of nozzles 15 (refer to FIG. 3) on the ejection surface facing the recording medium 3. The nozzles 15 are arranged in the conveyance direction of the recording medium 3 orthogonal to the main scanning direction, and define the print width when the image is formed on the recording medium 3. For example, the ink ejected from each of the inkjet heads 11*c*, 11*m*, 11*y*, and 11*k* contains at least pigment.

The treatment liquid ejection heads 12*a* and 12*b* are arranged on the same line as the plurality of inkjet heads 11*c*, 11*m*, 11*y*, and 11*k* in the main scanning direction. That is, the plurality of inkjet heads 11*c*, 11*m*, 11*y*, and 11*k* is arranged in such a manner that both sides in the main scanning direction are interposed between the treatment liquid ejection heads 12*a* and 12*b*.

The treatment liquid ejection head 12*a* is provided with a first treatment liquid ejection head 13 and a second treatment liquid ejection head 14. The second treatment liquid ejection head 14 is arranged at a position adjacent to the inkjet head 11*c* at the same interval as that of the plurality of inkjet heads 11*c*, 11*m*, 11*y*, and 11*k*. The first treatment liquid ejection head 13 in the treatment liquid ejection head 12*a* is arranged on an outer side of the second treatment liquid ejection head 14. An interval between the first treatment liquid ejection head 13 and the second treatment liquid ejection head 14 is made larger than the interval of the plurality of inkjet heads 11*c*, 11*m*, 11*y*, and 11*k*.

The treatment liquid ejection head 12*b* is provided with the first treatment liquid ejection head 13. The first treatment liquid ejection head 13 of the treatment liquid ejection head 12*b* is arranged on an outer side of the inkjet head 11*k* at an interval wider than the arrangement interval of the plurality of inkjet heads 11*c*, 11*m*, 11*y*, and 11*k*. For example, the interval between the first treatment liquid ejection head 13 of the treatment liquid ejection head 12*b* and the inkjet head 11*k* is the same as the interval between the first treatment liquid ejection head 13 and the second treatment liquid ejection head 14 in the treatment liquid ejection head 12*a*.

In this manner, the inkjet recording device 1 of this embodiment is provided with two first treatment liquid ejection heads 13 and one second treatment liquid ejection head 14, and the first treatment liquid ejection heads 13 are arranged on both sides of the inkjet unit 11 in the main scanning direction.

The first treatment liquid ejection head 13 ejects a first treatment liquid to the recording medium 3. The first treatment liquid is a liquid preferably ejected to the recording medium 3 before the ink is ejected to the recording medium 3, and is used as a pre-treatment liquid. For example, the first treatment liquid contains a coagulant that coagulates ink containing pigment. The first treatment liquid containing the coagulant flocculates the ink ejected to the recording medium 3, thereby emphasizing the color of the ink, so that color unevenness may be suppressed.

When the inkjet unit 11 moves in the main scanning direction, the two first treatment liquid ejection heads 13 and 13 mounted on the carriage 10 alternatively switch the head that ejects the first treatment liquid depending on whether the moving direction is forward or backward. For example, when the inkjet unit moves in a forward direction illustrated in FIG. 2, the first treatment liquid ejection head 13 provided in the treatment liquid ejection head 12*a* ejects the first treatment liquid, so that the first treatment liquid may be ejected to the recording medium 3 before the ink ejection by the inkjet heads 11*c*, 11*m*, 11*y*, and 11*k* is performed. For example, when the inkjet unit 11 moves in a backward direction illustrated in FIG. 2, the first treatment liquid ejection head 13 provided in the treatment liquid ejection head 12*b* ejects the first treatment liquid, so that the first treatment liquid may be ejected to the recording medium 3 before the ink ejection by the inkjet heads 11*c*, 11*m*, 11*y*, and 11*k* is performed.

The second treatment liquid ejection head 14 ejects a second treatment liquid to the recording medium 3. The second treatment liquid may be ejected to the recording medium 3 before the ink is ejected to the recording medium 3, or may be ejected to the recording medium 3 after the ink is ejected to the recording medium 3. That is, the second treatment liquid may be used as both pre-treatment liquid and post-treatment liquid. For example, the second treatment liquid contains a resin dispersing agent obtained by dispersing a resin into a solution. The second treatment liquid containing the resin dispersing agent is ejected to the recording medium 3 and then dried, thereby curing a surface of the recording medium 3 to enhance fastness to rubbing.

When the inkjet unit 11 moves in the main scanning direction, one second treatment liquid ejection head 14 mounted on the carriage 10 switches a timing to eject the second treatment liquid depending on whether the moving direction is the forward direction or the backward direction.

For example, when the inkjet unit 11 moves in the forward direction illustrated in FIG. 2, the second treatment liquid ejection head 14 provided in the treatment liquid ejection head 12*a* ejects the second treatment liquid to the recording medium 3 before the ink ejection by the inkjet heads 11*c*, 11*m*, 11*y*, and 11*k* is performed. For example, when the inkjet unit 11 moves in the backward direction illustrated in FIG. 2, the second treatment liquid ejection head 14 provided in the treatment liquid ejection head 12*a* ejects the second treatment liquid to the recording medium 3 after the ink ejection by the inkjet heads 11*c*, 11*m*, 11*y*, and 11*k* is performed.

Figure 3:
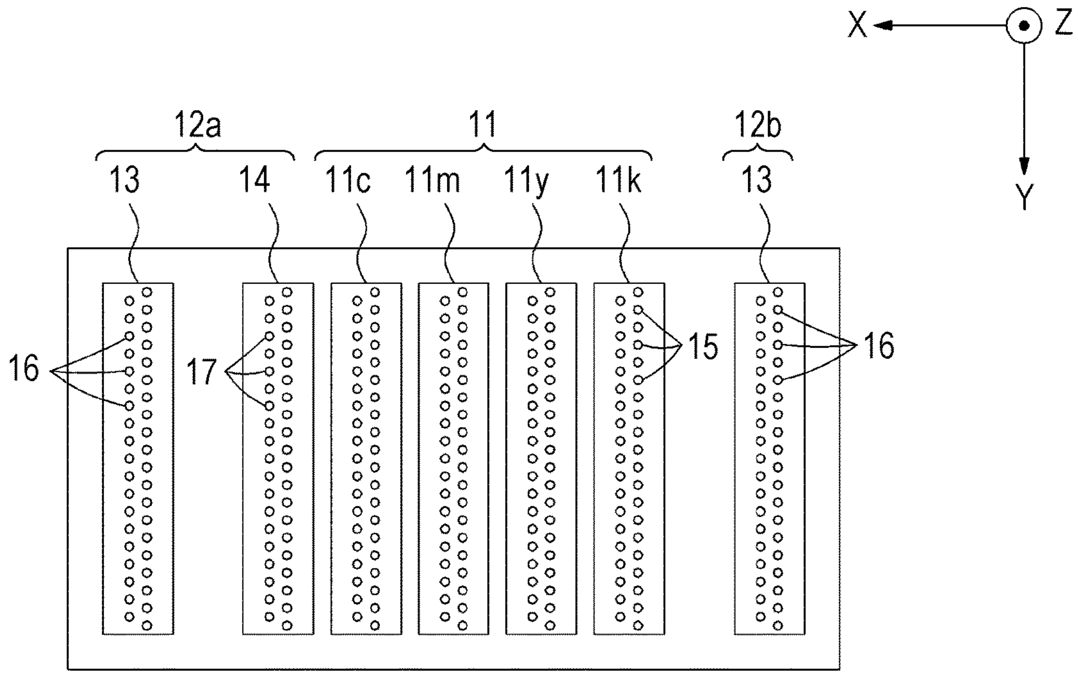
FIG. 3 is a view illustrating a nozzle configuration in an inkjet head, a first treatment liquid ejection head, and a second treatment liquid ejection head.

FIG. 3 is a view illustrating a nozzle configuration in the inkjet heads 11*c*, 11*m*, 11*y*, and 11*k*, the first treatment liquid ejection head 13, and the second treatment liquid ejection head 14. As illustrated in FIG. 3, the inkjet heads 11*c*, 11*m*, 11*y*, and 11*k* are provided with a large number of nozzles 15 arranged in the conveyance direction (Y direction) of the recording medium 3. The first treatment liquid ejection head 13 is also provided with a large number of nozzles 16 arranged in the conveyance direction (Y direction) of the recording medium 3. Furthermore, the second treatment liquid ejection head 14 is also provided with a large number of nozzles 17 arranged in the conveyance direction (Y direction) of the recording medium 3. The nozzles 16 and 17 of the first treatment liquid ejection head 13 and the second treatment liquid ejection head 14, respectively, are provided at the same positions as positions of the nozzles 15 of the inkjet heads 11*c*, 11*m*, 11*y*, and 11*k* in the conveyance direction of the recording medium 3. Therefore, the first treatment liquid ejection head 13 may eject the first treatment liquid to positions at which the ink is ejected by the inkjet heads 11*c*, 11*m*, 11*y*, and 11*k*. The second treatment liquid ejection head 14 may also eject the second treatment liquid to the positions at which the ink is ejected by the inkjet heads 11*c*, 11*m*, 11*y*, and 11*k*.

Figure 4A:
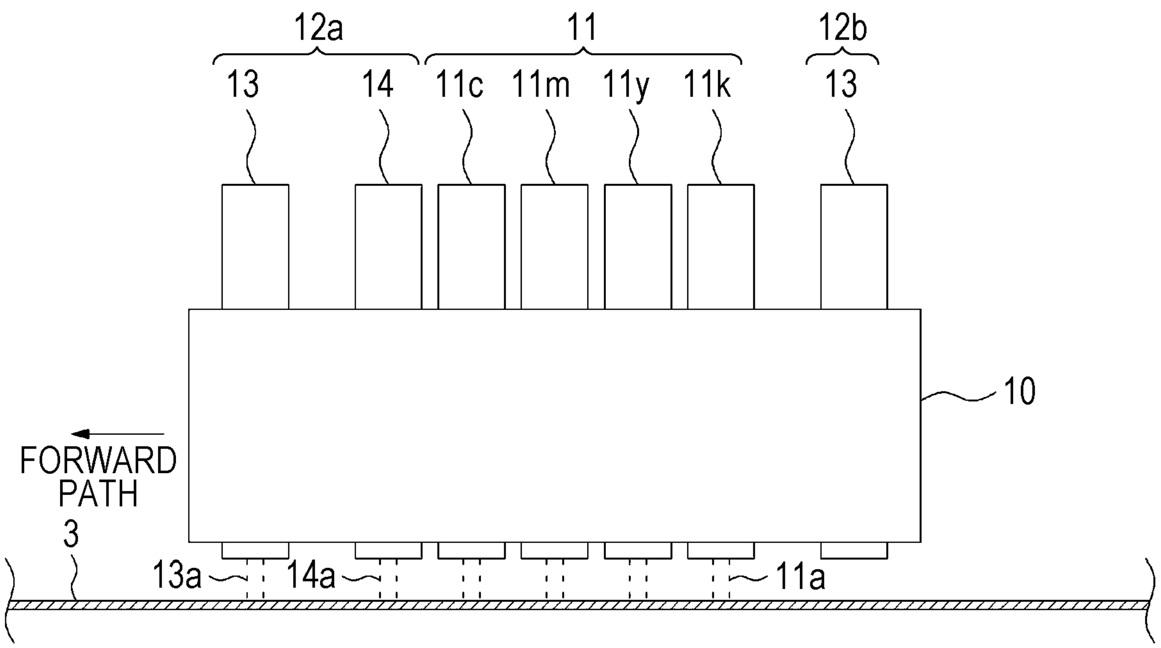
FIGS. 4A and 4B are views illustrating operations of the inkjet unit and the treatment liquid ejection heads in the inkjet recording device.
Figure 4B:
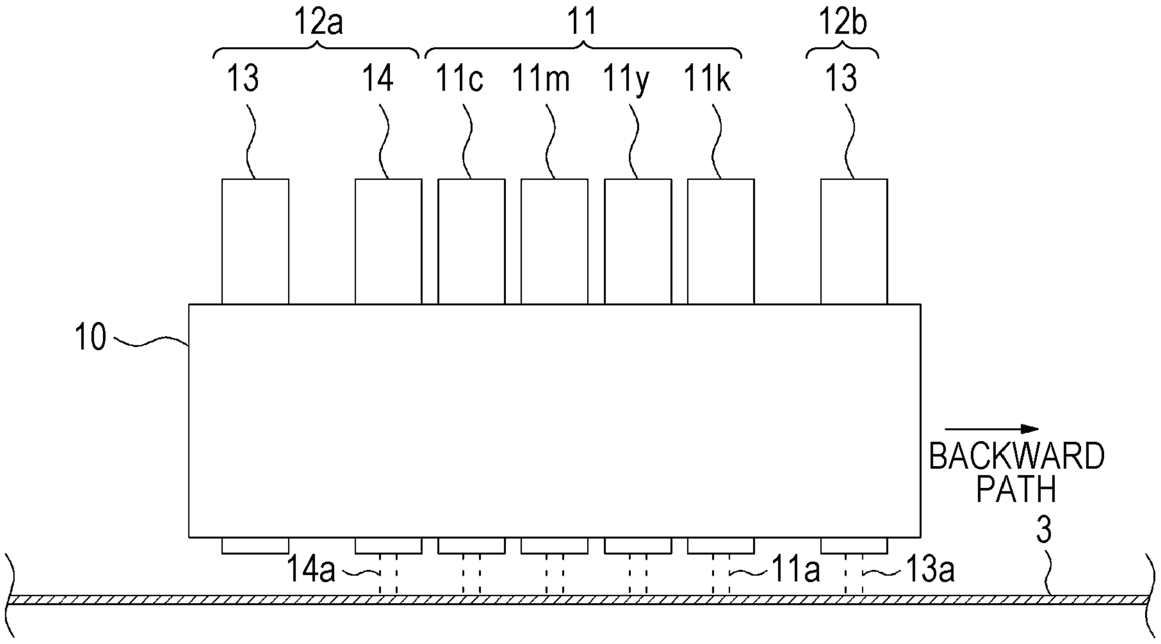

Next, FIGS. 4A and 4B are views illustrating operations of the inkjet unit 11 and the treatment liquid ejection heads 12*a* and 12*b* in the inkjet recording device 1 of this embodiment. First, FIG. 4A illustrates a case where the carriage 10 moves in the forward direction in the main scanning direction. When moving the carriage 10 in the forward direction in the main scanning direction, the control unit 30 drives the first treatment liquid ejection head 13 of the treatment liquid ejection head 12*a*, the second treatment liquid ejection head 14 of the treatment liquid ejection head 12*a*, and the inkjet heads 11*c*, 11*m*, 11*y*, and 11*k* to form the image on the recording medium 3. Specifically, the control unit 30 drives the first treatment liquid ejection head 13 of the treatment liquid ejection head 12*a* to eject a first treatment liquid 13*a* to the recording medium 3, then drives the second treatment liquid ejection head 14 of the treatment liquid ejection head 12*a* to eject a second treatment liquid 14*a* to the recording medium 3, and then drives the inkjet heads 11*c*, 11*m*, 11*y*, and 11*k* to eject ink 11*a* to the recording medium 3 while moving the carriage 10 in the forward direction. As a result, the first treatment liquid 13*a* and the second treatment liquid 14*a* may be ejected to the recording medium 3 before the ink 11*a* is ejected. The inkjet heads 11*c*, 11*m*, 11*y*, and 11*k* eject the ink 11*a* of each color of Y, M, C, and K to the recording medium 3 to which the first treatment liquid 13*a* and the second treatment liquid 14*a* have been ejected to form the image.

When ejecting the first treatment liquid 13*a* and the second treatment liquid 14*a* to the recording medium 3, the control unit 30 drives the first treatment liquid ejection head 13 and the second treatment liquid ejection head 14 on the basis of the image data to be printed. In other words, the control unit 30 control to eject the first treatment liquid 13*a* and the second treatment liquid 14*a* only to the image area including the effective image component in the image data, and not to eject the first treatment liquid 13*a* and the second treatment liquid 14*a* to the margin area not including the effective image component in the image data. As a result, it is possible to prevent the first treatment liquid 13*a* and the second treatment liquid 14*a* from being ejected to the margin area to which the ink is not ejected, thereby reducing a consumption amount of the first treatment liquid 13*a* and the second treatment liquid 14*a*. Therefore, there is an advantage that a running cost may be suppressed as compared with an operation of ejecting the first treatment liquid 13*a* and the second treatment liquid 14*a* also to the margin area.

The first treatment liquid ejection head 13 that ejects the first treatment liquid 13*a* when the carriage 10 moves in the forward direction is provided at a position away from the inkjet heads 11*c*, 11*m*, 11*y*, and 11*k* and the second treatment liquid ejection head 14 arranged on an inner side of the carriage 10 by a predetermined interval or more. Specifically, the first treatment liquid ejection head 13 of the treatment liquid ejection head 12*a* is provided at a position away from the adjacent second treatment liquid ejection head 14 by the arrangement interval of the inkjet heads 11*c*, 11*m*, 11*y*, and 11*k* or more. Therefore, the first treatment liquid 13*a* scattered when the first treatment liquid is ejected from the first treatment liquid ejection head 13 may be prevented from adhering to the inkjet heads 11*c*, 11*m*, 11*y*, and 11*k* and the second treatment liquid ejection head 14. That is, since the first treatment liquid 13*a* contains the coagulant, when the first treatment liquid 13*a* adheres to the nozzles 15 of the inkjet heads 11*c*, 11*m*, 11*y*, and 11*k* and the nozzles 17 of the second treatment liquid ejection head 14, the nozzles 15 and 17 might be clogged when the first treatment liquid is dried. In order to prevent this, the first treatment liquid ejection head 13 of the treatment liquid ejection head 12*a* is provided at a position away from the adjacent second treatment liquid ejection head 14 by a predetermined interval or more.

Next, FIG. 4B illustrates a case where the carriage 10 moves in the backward direction in the main scanning direction. When moving the carriage 10 in the backward direction in the main scanning direction, the control unit 30 drives the first treatment liquid ejection head 13 of the treatment liquid ejection head 12*b*, the inkjet heads 11*c*, 11*m*, 11*y*, and 11*k*, and the second treatment liquid ejection head 14 of the treatment liquid ejection head 12*a* to form the image on the recording medium 3. Specifically, the control unit 30 first drives the first treatment liquid ejection head 13 of the treatment liquid ejection head 12*b* to eject the first treatment liquid 13*a* to the recording medium 3, then drives the inkjet heads 11*c*, 11*m*, 11*y*, and 11*k* to eject the ink 11*a* to the recording medium 3, and then drives the second treatment liquid ejection head 14 of the treatment liquid ejection head 12*a* to eject the second treatment liquid 14*a* to the recording medium 3 while moving the carriage 10 in the backward direction. As a result, the first treatment liquid 13*a* may be ejected to the recording medium 3 before the ink 11*a* is ejected, and the second treatment liquid 14*a* may be ejected to the recording medium 3 after the ink 11*a* is ejected. Note that, also when the carriage 10 is moved in the backward direction, the control unit 30 drives the first treatment liquid ejection head 13 and the second treatment liquid ejection head 14 on the basis of the image data to be printed. As a result, it is possible to control not to eject the first treatment liquid 13*a* and the second treatment liquid

14*a* to the margin area not including the effective image component in the image data.

The first treatment liquid ejection head 13 that ejects the first treatment liquid 13*a* when the carriage 10 moves in the backward direction is provided at a position away from the inkjet heads 11*c*, 11*m*, 11*y*, and 11*k* and the second treatment liquid ejection head 14 arranged on an inner side of the carriage 10 by a predetermined interval or more. Specifically, the first treatment liquid ejection head 13 of the treatment liquid ejection head 12*b* is provided at a position away from the adjacent inkjet head 11*k* by an arrangement interval of the inkjet heads 11*c*, 11*m*, 11*y*, and 11*k* or more. Therefore, the first treatment liquid 13*a* scattered when the first treatment liquid 13*a* is ejected from the first treatment liquid ejection head 13 may be prevented from adhering to the inkjet heads 11*c*, 11*m*, 11*y*, and 11*k* and the second treatment liquid ejection head 14. That is, in order to prevent the clogging of the nozzles 15 and 17 by the first treatment liquid 13*a*, the first treatment liquid ejection head 13 of the treatment liquid ejection head 12*b* is provided at a position away from the adjacent inkjet head 11*k* by a predetermined interval or more.

In this manner, the inkjet recording device 1 of this embodiment uses, as the first treatment liquid 13*a*, the pre-treatment liquid preferably ejected to the recording medium 3 before the ink is ejected to the recording medium 3, and uses, as the second treatment liquid 14*a*, the treatment liquid that may be used before and after the ink is ejected to the recording medium 3. In the inkjet recording device 1, two first treatment liquid ejection heads 13 are mounted on the carriage 10. The two first treatment liquid ejection heads 13 are arranged on both sides of the inkjet unit 11 that ejects the ink in the main scanning direction, and the head that ejects the first treatment liquid 13*a* is alternatively switched between when the carriage 10 moves in the forward direction and when this moves in the backward direction. Therefore, the inkjet recording device 1 of this embodiment may eject the first treatment liquid 13*a* to the recording medium 3 before the ink 11*a* is ejected to the recording medium 3 regardless of whether the carriage 10 is moved in the forward direction or the backward direction. As a result, the inkjet recording device 1 may form an image on the recording medium 3 on both forward path and backward path of the carriage 10, and productivity may be enhanced.

Figure 5:
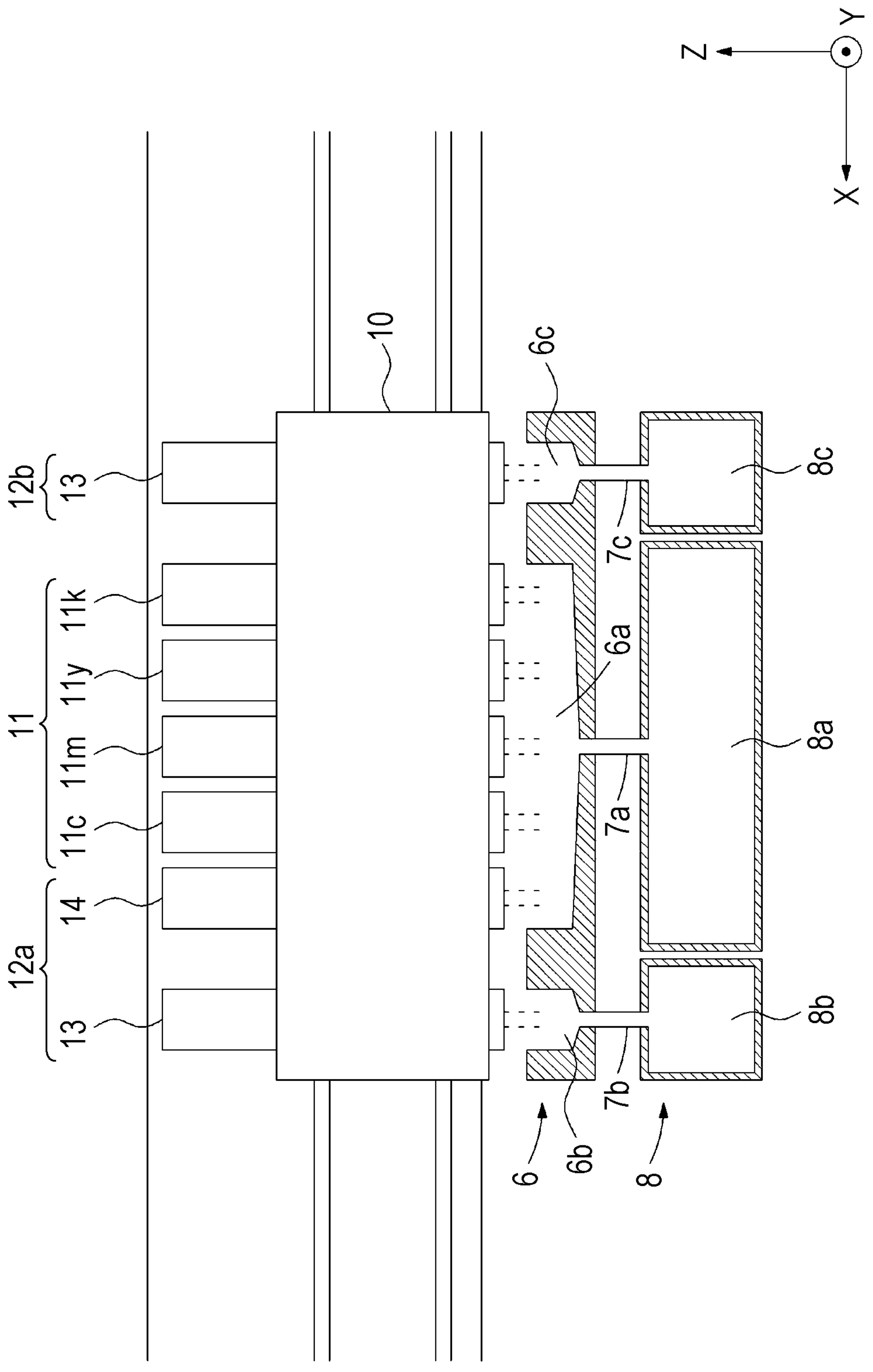
FIG. 5 is a conceptual diagram illustrating a state in which the carriage is moved to a position above a purge tub.

Next, a cleaning operation of the inkjet unit 11 and the treatment liquid ejection heads 12*a* and 12*b* in the inkjet recording device 1 is described. FIG. 5 is a conceptual diagram illustrating a state in which the carriage 10 is moved to the position above the purge tub 6. As illustrated in FIG. 5, the purge tub 6 is provided with a first purge tub 6*a* that recovers the ink purged and discharged from the inkjet unit 11, and second purge tubs 6*b* and 6*c* provided on both sides of the first purge tub 6*a* that recover the first treatment liquid purged and discharged from the two first treatment liquid ejection heads 13, respectively. Note that, the second treatment liquid purged and discharged from the second treatment liquid ejection head 14 is recovered by the first purge tub 6*a*. The waste liquid tank 8 provided below the purge tub 6 is provided with a first waste liquid tank 8*a* that recovers the ink and the second treatment liquid purged and discharged into the first purge tub 6*a*, and second waste liquid tanks 8*b* and 8*c* that recover the first treatment liquid purged and discharged into the second purge tubs 6*b* and 6*c*, respectively. The first purge tub 6*a* and the first waste liquid tank 8*a* are connected to each other by a first tube 7*a*, and the ink and the second treatment liquid purged and discharged into the first purge tub 6*a* are supplied to the first waste liquid tank 8*a* via the first tube 7*a*. The second purge tub 6*b* and the second waste liquid tank 8*b* are connected to each other by a second tube 7*b*, and the first treatment liquid purged and discharged into the second purge tub 6*b* are supplied to the second waste liquid tank 8*b* via a second tube 7*b*. Furthermore, the second purge tub 6*c* the second waste liquid tank 8*c* are connected to each other by a second tube 7*c*, and the first treatment liquid purged and discharged into the second purge tub 6*c* is supplied to the second waste liquid tank 8*c* via a second tube 7*c*.

In this manner, the purge tub 6 has a configuration in which a portion that recovers the ink and second treatment liquid and a portion that recovers the first treatment liquid are separately provided. This is for preventing the first treatment liquid scattered when the first treatment liquid is purged and discharged from the first treatment liquid ejection head 13 from adhering to the inkjet heads 11*c*, 11*m*, 11*y*, and 11*k* and the second treatment liquid ejection head 14. That is, in this embodiment, a configuration in which the first purge tub 6*a* that recovers the ink and the second treatment liquid and the second purge tubs 6*b* and 6*c* that recover the first treatment liquid are separated is adopted. As a result, even in a case where the first treatment liquid purged and discharged from the first treatment liquid ejection head 13 scatters, it is possible to suppress the first treatment liquid from going over a partition wall between the first purge tub 6*a* and the second purge tubs 6*b* and 6*c*, and it is possible to prevent the first treatment liquid from adhering to the nozzles 15 of the inkjet heads 11*c*, 11*m*, 11*y*, and 11*k* and the nozzles 17 of the second treatment liquid ejection head 14 in advance.

By separating the first purge tub 6*a* and the second purge tubs 6*b* and 6*c* from each other, it is also possible to prevent the coagulated ink from adhering to the first tube 7*a* to clog. Therefore, the ink and the second treatment liquid purged and discharged from the inkjet heads 11*c*, 11*m*, 11*y*, and 11*k* and the second treatment liquid ejection head 14, respectively, may be appropriately recovered in the first waste liquid tank 8*a*.

As described above, the first treatment liquid ejection heads 13 and 13 have an interval of a predetermined value or more from the second treatment liquid ejection head 14 or the inkjet head 11*k*. That is, it is desired in such a manner that, even if the first treatment liquid scatters when the first treatment liquid is purged and discharged by the first treatment liquid ejection heads 13 and 13, the scattered first treatment liquid does not reach the second treatment liquid ejection head 14 or the inkjet head 11*k*. It is possible to prevent the first treatment liquid from adhering to the nozzles 15 of the inkjet heads 11*c*, 11*m*, 11*y*, and 11*k* and the nozzles 17 of the second treatment liquid ejection head 14 in advance also with such a configuration.

Figure 6:
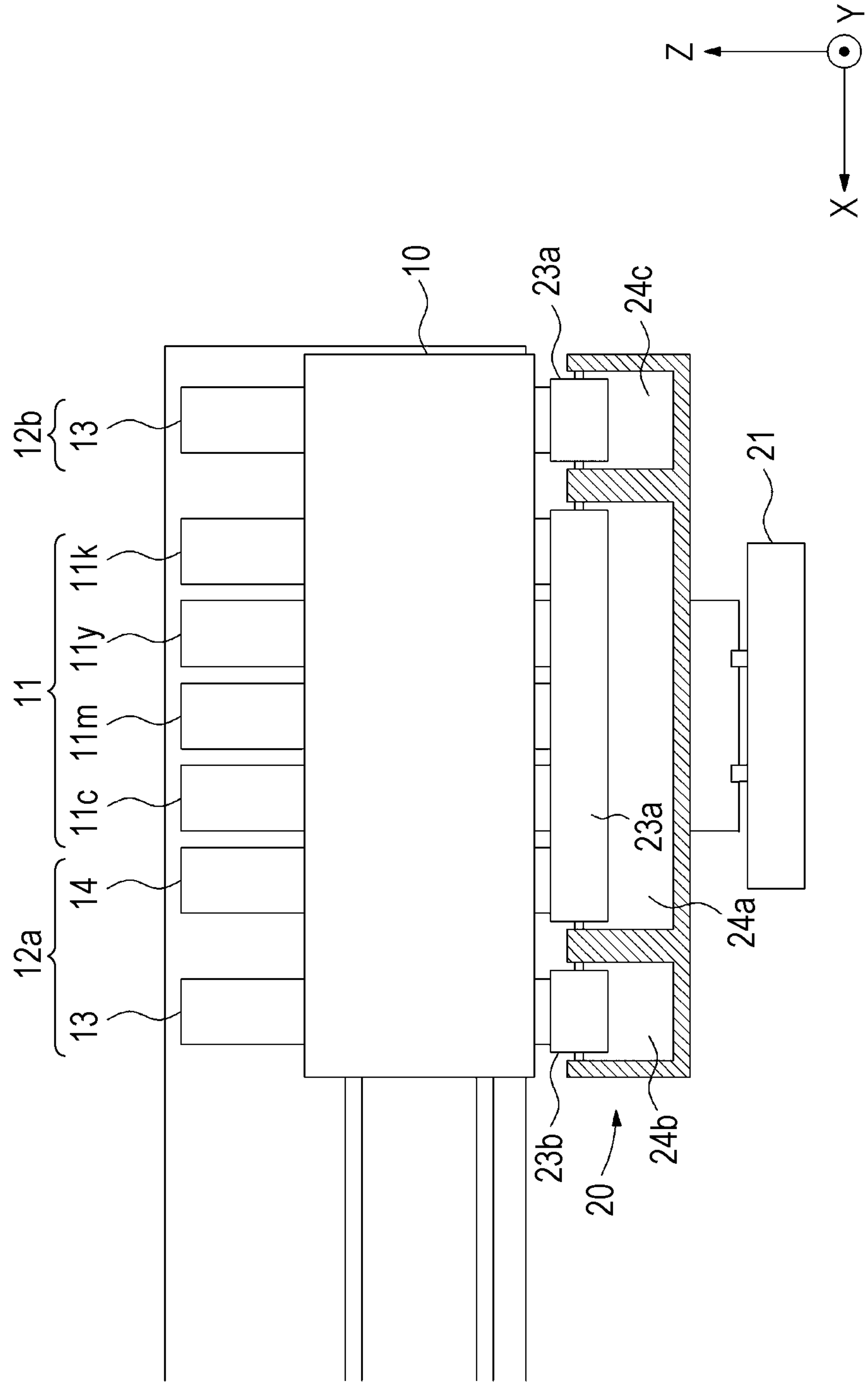
FIG. 6 is a conceptual diagram illustrating a state in which the carriage is moved to a position above a cleaner.
Figure 7:
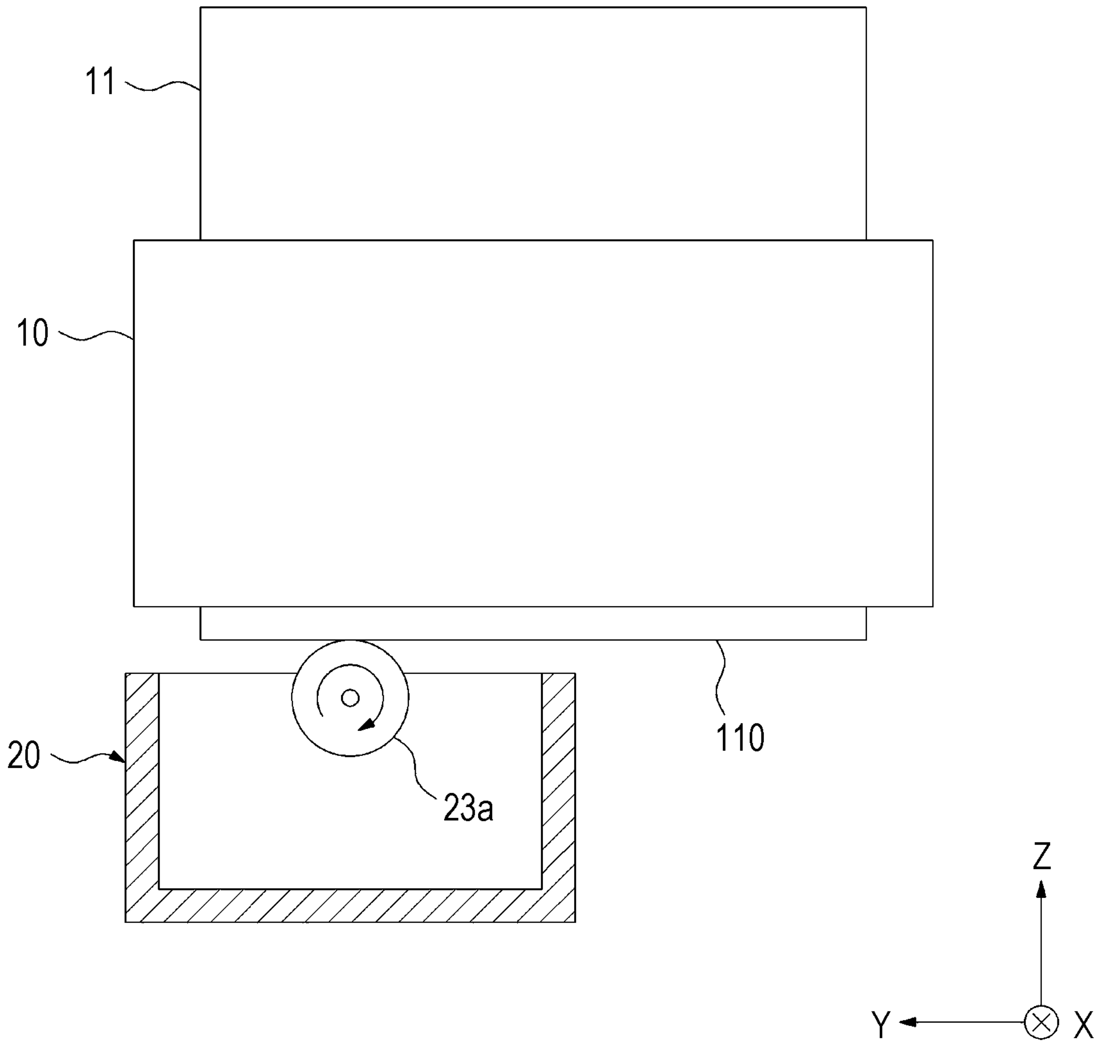
FIG. 7 is a view illustrating a cleaning operation by the cleaner.

Next, FIGS. 6 and 7 are conceptual diagrams illustrating a state in which the carriage 10 is moved to the position above the cleaner 20. As illustrated in FIG. 6, the cleaner 20 is provided with a first cleaner 24*a* provided at the center in the main scanning direction, and second cleaners 24*b* and 24*c* provided on both sides of the first cleaner 24*a*. The first cleaner 24*a* and the second cleaners 24*b* and 24*c* are provided at positions away from each other by a predetermined interval or more. The first cleaner 24*a* is provided with a cleaning roller 23*a* for cleaning the nozzles 15 of the inkjet heads 11*c*, 11*m*, 11*y*, and 11*k* and the nozzles 17 of the second treatment liquid ejection head 14. The second cleaners 24*b* and 24*c* are provided with cleaning rollers 23*b* and 23*c* for cleaning the nozzles 16 of the first treatment liquid ejection heads 13 and 13, respectively.

When cleaning the inkjet heads 11*c*, 11*m*, 11*y*, and 11*k*, the first treatment liquid ejection heads 13 and 13, and the second treatment liquid ejection head 14, the cleaner 20 brings the cleaning roller 23*a* into contact with lower surfaces of the inkjet heads 11*c*, 11*m*, 11*y*, and 11*k* and the second treatment liquid ejection head 14, and brings the cleaning rollers 23*b* and 23*c* into contact with the first treatment liquid ejection heads 13 and 13, respectively. As illustrated in FIG. 7, the cleaner 20 moves in the Y direction along the rail member 21 while rotating the cleaning rollers 23*a*, 23*b*, and 23*c* in a predetermined direction, thereby cleaning the ejection surfaces 110 of the inkjet heads 11*c*, 11*m*, 11*y*, and 11*k*, the first treatment liquid ejection heads 13 and 13, and the second treatment liquid ejection head 14.

In this manner, the cleaner 20 of this embodiment has a configuration in which the cleaning rollers 23*b* and 23*c* that clean the first treatment liquid ejection heads 13 and 13 are separated from the cleaning roller 23*a* that cleans the inkjet heads 11*c*, 11*m*, 11*y*, and 11*k* and the second treatment liquid ejection head 14 by a predetermined interval or more. Therefore, the first treatment liquid wiped from the ejection surfaces 110 of the first treatment liquid ejection heads 13 and 13 by the cleaning rollers 23*b* and 23*c* does not adhere again to the ejection surfaces 110 of the inkjet heads 11*c*, 11*m*, 11*y*, and 11*k* and the second treatment liquid ejection head 14. As a result, coagulation of the ink on the ejection surface 110 of the inkjet heads 11*c*, 11*m*, 11*y*, and 11*k* may be suppressed, and the clogging of the nozzles 15 and the like may be prevented in advance.

Second Embodiment

Next, a second embodiment of the present invention is described. An inkjet recording device 1 of this embodiment is different from that of the first embodiment in arrangement configuration of an inkjet unit 11 and treatment liquid ejection heads 12*a* and 12*b* mounted on a carriage 10. Different points will be described below.

Figure 8:
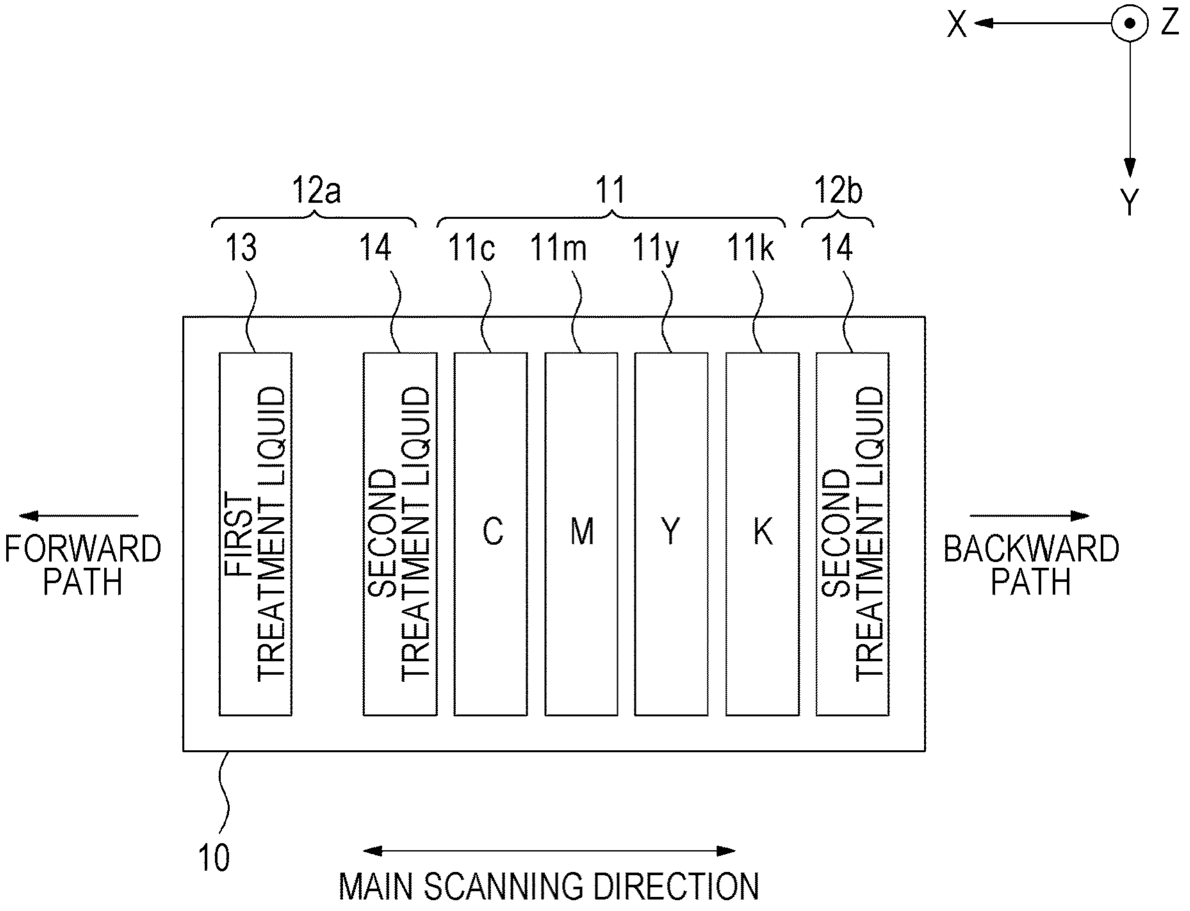
FIG. 8 is a planar view illustrating an inkjet unit and a treatment liquid ejection head mounted on a carriage in a second embodiment.

FIG. 8 is a planar view illustrating the inkjet unit 11 and the treatment liquid ejection heads 12*a* and 12*b* mounted on the carriage 10 in the second embodiment. As illustrated in FIG. 8, the inkjet unit 11 is arranged at the center of the carriage 10 in a main scanning direction. The treatment liquid ejection heads 12*a* and 12*b* are arranged on both sides of the inkjet unit 11 in the main scanning direction. The inkjet unit 11 is provided with a plurality of inkjet heads 11*c*, 11*m*, 11*y*, and 11*k* arranged at predetermined intervals in the main scanning direction, and ejects ink of four colors of Y, M, C, and K to a recording medium 3 as in the first embodiment. The treatment liquid ejection heads 12*a* and 12*b* are arranged on the same line as the plurality of inkjet heads 11*c*, 11*m*, 11*y*, and 11*k* in the main scanning direction.

The treatment liquid ejection head 12*a* provided on one side of the inkjet unit 11 is provided with a first treatment liquid ejection head 13 and a second treatment liquid ejection head 14. In the treatment liquid ejection head 12*a*, the second treatment liquid ejection head 14 is arranged at a position adjacent to the inkjet head 11*c* at the same interval as that of the plurality of inkjet heads 11*c*, 11*m*, 11*y*, and 11*k*. The first treatment liquid ejection head 13 in the treatment liquid ejection head 12*a* is arranged on an outer side of the second treatment liquid ejection head 14. An interval between the first treatment liquid ejection head 13 and the second treatment liquid ejection head 14 is made larger than the interval of the plurality of inkjet heads 11*c*, 11*m*, 11*y*, and 11*k*.

The treatment liquid ejection head 12*b* provided on the other side of the inkjet unit 11 is provided with the second treatment liquid ejection head 14. In the treatment liquid ejection head 12*b*, the second treatment liquid ejection head 14 is arranged at a position adjacent to the inkjet head 11*k* at the same interval as that of the plurality of inkjet heads 11*c*, 11*m*, 11*y*, and 11*k*.

In this manner, the inkjet recording device 1 of this embodiment is provided with one first treatment liquid ejection head 13 and two second treatment liquid ejection heads 14, and the second treatment liquid ejection heads 14 are arranged on both sides of the inkjet unit 11 in the main scanning direction.

The first treatment liquid ejection head 13 ejects a first treatment liquid to the recording medium 3. The first treatment liquid in this embodiment is a treatment liquid that may be ejected to the recording medium 3 before ink is ejected to the recording medium 3 or may be ejected to the recording medium 3 after the ink is ejected to the recording medium 3. That is, the first treatment liquid is a liquid that may be used as both pre-treatment liquid and post-treatment liquid. For example, the first treatment liquid is a liquid containing a coagulant that coagulates ink containing pigment.

The second treatment liquid ejection head 14 ejects a second treatment liquid to the recording medium 3. The second treatment liquid in this embodiment is a liquid preferably ejected to the recording medium 3 after the ink is ejected to the recording medium 3, and is used as the post-treatment liquid. For example, the second treatment liquid is the liquid containing a resin dispersing agent obtained by dispersing a resin into a solution.

When the inkjet unit 11 moves in the main scanning direction, the two second treatment liquid ejection heads 14 and 14 mounted on the carriage 10 alternatively switch the head that ejects the second treatment liquid depending on whether the moving direction is forward or backward. For example, when the inkjet unit 11 moves in the forward direction illustrated in FIG. 8, the second treatment liquid ejection head 14 provided in the treatment liquid ejection head 12*b* ejects the second treatment liquid. As a result, during the movement in the forward direction, the second treatment liquid may be ejected to the recording medium 3 after the ink ejection by the inkjet heads 11*c*, 11*m*, 11*y*, and 11*k* is performed. For example, when the inkjet unit moves in the backward direction illustrated in FIG. 8, the second treatment liquid ejection head 14 provided in the treatment liquid ejection head 12*a* ejects the second treatment liquid. As a result, during the movement in the backward direction, the second treatment liquid may be ejected to the recording medium 3 after the ink ejection by the inkjet heads 11*c*, 11*m*, 11*y*, and 11*k* is performed.

When the inkjet unit 11 moves in the main scanning direction, the one first treatment liquid ejection head 13 mounted on the carriage 10 switches a timing to eject the first treatment liquid depending on whether the moving direction is the forward direction or the backward direction. For example, when the inkjet unit 11 moves in the forward direction illustrated in FIG. 8, the first treatment liquid ejection head 13 provided in the treatment liquid ejection head 12*a* ejects the first treatment liquid to the recording medium 3 before the ink ejection by the inkjet heads 11*c*, 11*m*, 11*y*, and 11*k* is performed. For example, when the inkjet unit 11 moves in the backward direction illustrated in FIG. 8, the first treatment liquid ejection head 13 provided in the treatment liquid ejection head 12*a* ejects the first treatment liquid to the recording medium 3 after the ink ejection by the inkjet heads 11*c*, 11*m*, 11*y*, and 11*k* is performed.

Figure 9A:
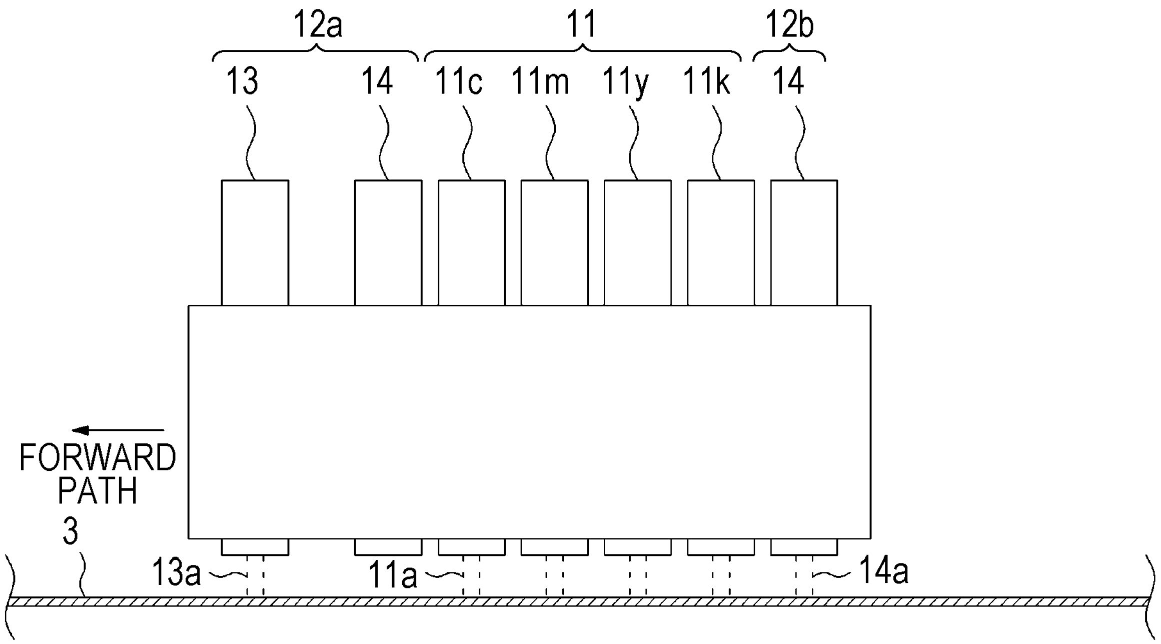
FIGS. 9A and 9B are views illustrating operations of the inkjet unit and the treatment liquid ejection heads in the second embodiment.
Figure 9B:
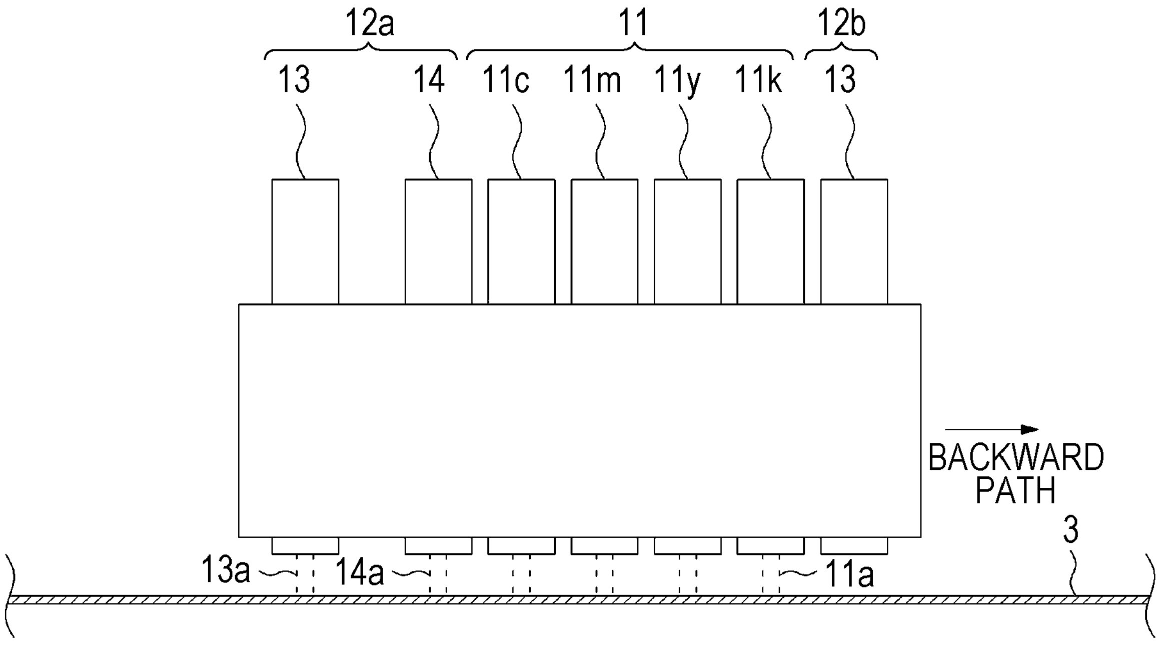

Next, FIGS. 9A and 9B are views illustrating operations of the inkjet unit 11 and the treatment liquid ejection heads 12*a* and 12*b* in the inkjet recording device 1 of this embodiment. First, FIG. 9A illustrates a case where the carriage 10 moves in the forward direction in the main scanning direction. When moving the carriage 10 in the forward direction in the main scanning direction, the control unit 30 drives the first treatment liquid ejection head 13 of the treatment liquid ejection head 12*a*, the inkjet heads 11*c*, 11*m*, 11*y*, and 11*k*, and the second treatment liquid ejection head 14 of the treatment liquid ejection head 12*b* to form an image on the recording medium 3. Specifically, the control unit 30 drives the first treatment liquid ejection head 13 of the treatment liquid ejection head 12*a* to eject a first treatment liquid 13*a* to the recording medium 3, then drives the inkjet heads 11*c*, 11*m*, 11*y*, and 11*k* to eject ink 11*a* to the recording medium 3, and then drives the second treatment liquid ejection head 14 of the treatment liquid ejection head 12*b* to eject a second treatment liquid 14*a* to the recording medium 3 while moving the carriage 10 in the forward direction. As a result, the first treatment liquid 13*a* may be ejected to the recording medium 3 before the ink 11*a* is ejected, and the second treatment liquid 14*a* may be ejected to the recording medium 3 after the ink 11*a* is ejected. Note that, when ejecting the first treatment liquid 13*a* and the second treatment liquid 14*a* to the recording medium 3, the control unit 30 drives the first treatment liquid ejection head 13 and the second treatment liquid ejection head 14 on the basis of image data to be printed as in the first embodiment.

FIG. 9B illustrates a case where the carriage 10 moves in the backward direction in the main scanning direction. When moving the carriage 10 in the backward direction in the main scanning direction, the control unit 30 drives the inkjet heads 11*c*, 11*m*, 11*y*, and 11*k*, the second treatment liquid ejection head 14 of the treatment liquid ejection head 12*a*, and the first treatment liquid ejection head 13 of the treatment liquid ejection head 12*a* to form the image on the recording medium 3. Specifically, the control unit 30 first drives the inkjet heads 11*c*, 11*m*, 11*y*, and 11*k* to eject the ink 11*a* to the recording medium 3, then drives the second treatment liquid ejection head 14 of the treatment liquid ejection head 12*a* to eject the second treatment liquid 14*a* to the recording medium 3, and then drives the first treatment liquid ejection head 13 of the treatment liquid ejection head 12*a* to eject the first treatment liquid 13*a* to the recording medium 3 while moving the carriage 10 in the backward direction. As a result, the first treatment liquid 13*a* and the second treatment liquid 14*a* may be ejected to the recording medium 3 after the ink 11*a* is ejected.

In this manner, the inkjet recording device 1 of this embodiment uses, as the first treatment liquid 13*a*, the treatment liquid that may be used both before and after the ink is ejected to the recording medium 3, and uses, as the second treatment liquid 14*a*, the post-treatment liquid preferably ejected to the recording medium 3 after the ink is ejected to the recording medium 3. In the inkjet recording device 1, the two second treatment liquid ejection heads 14 are mounted on the carriage 10. The two second treatment liquid ejection heads 14 are arranged on both sides of the inkjet unit 11 that ejects the ink in the main scanning direction, and the head that ejects the second treatment liquid 14*a* is alternatively switched between when the carriage 10 moves in the forward direction and when this moves in the backward direction. Therefore, the inkjet recording device 1 of this embodiment may eject the second treatment liquid 14*a* to the recording medium 3 after the ink 11*a* is ejected to the recording medium 3 regardless of whether the carriage 10 is moved in the forward direction or the backward direction. As a result, the inkjet recording device 1 may form an image on the recording medium 3 on both forward path and backward path of the carriage 10, and productivity may be enhanced.

The inkjet recording device 1 is provided with a purge tub 6 and a cleaner 20 as described in the first embodiment. In the above-described configuration, the first treatment liquid ejection head 13 is arranged at an outer position away from the inkjet heads 11*c*, 11*m*, 11*y*, and 11*k* and the second treatment liquid ejection head 14 by a predetermined interval or more. Therefore, as for the purge tub 6, it is possible to separately provide a first purge tub 6*a* that recovers the ink and the second treatment liquid and a second purge tub 6*b* that recovers the first treatment liquid at positions away from each other by a predetermined interval or more, and there is an advantage that the first treatment liquid may be prevented from adhering to other heads. As for the cleaner 20 also, it is possible to separately provide a first cleaner 24*a* that cleans the inkjet heads 11*c*, 11*m*, 11*y*, and 11*k* and the second treatment liquid ejection heads 14 and 14, and a second cleaner 24*b* that cleans the first treatment liquid ejection head 13 at positions away from each other by a predetermined interval or more, and there is an advantage that the first treatment liquid may be prevented from adhering to other heads.

Note that, points other than those described above in this embodiment are similar to those described in the first embodiment.

Third Embodiment

Next, a third embodiment of the present invention is described. An inkjet recording device 1 of this embodiment is different from that of the first and second embodiments in arrangement configuration of an inkjet unit 11 and treatment liquid ejection heads 12*a* and 12*b* mounted on a carriage 10. Different points will be described below.

Figure 10:
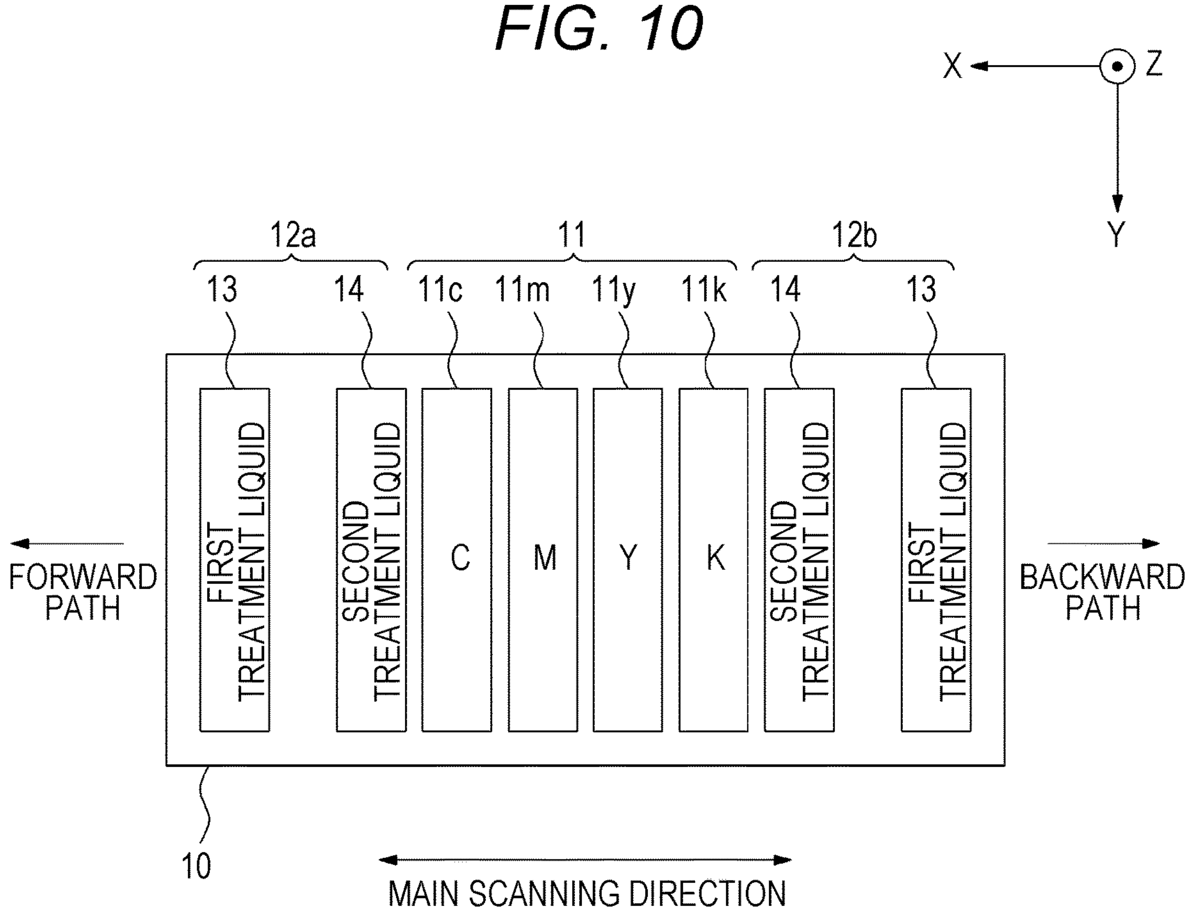
FIG. 10 is a planar view illustrating an inkjet unit and a treatment liquid ejection head mounted on a carriage in a third embodiment.

FIG. 10 is a planar view illustrating the inkjet unit 11 and the treatment liquid ejection heads 12*a* and 12*b* mounted on the carriage 10 in the third embodiment. As illustrated in FIG. 10, the inkjet unit 11 is arranged at the center of the carriage 10 in a main scanning direction. The treatment liquid ejection heads 12*a* and 12*b* are arranged on both sides of the inkjet unit 11 in the main scanning direction. The inkjet unit 11 is provided with a plurality of inkjet heads 11*c*, 11*m*, 11*y*, and 11*k* arranged at predetermined intervals in the main scanning direction, and ejects ink of four colors of Y, M, C, and K to a recording medium 3 as in the first and second embodiments. The treatment liquid ejection heads 12*a* and 12*b* are arranged on the same line as the plurality of inkjet heads 11*c*, 11*m*, 11*y*, and 11*k* in the main scanning direction.

The treatment liquid ejection head 12*a* provided on one side of the inkjet unit 11 is provided with a first treatment liquid ejection head 13 and a second treatment liquid ejection head 14. In the treatment liquid ejection head 12*a*, the second treatment liquid ejection head 14 is arranged at a position adjacent to the inkjet head 11*c* at the same interval as that of the plurality of inkjet heads 11*c*, 11*m*, 11*y*, and 11*k*. The first treatment liquid ejection head 13 in the treatment liquid ejection head 12*a* is arranged on an outer side of the second treatment liquid ejection head 14. An interval between the first treatment liquid ejection head 13 and the second treatment liquid ejection head 14 is made larger than the interval of the plurality of inkjet heads 11*c*, 11*m*, 11*y*, and 11*k*.

The treatment liquid ejection head 12*b* provided on the other side of the inkjet unit 11 is provided with the first treatment liquid ejection head 13 and the second treatment liquid ejection head 14. In the treatment liquid ejection head 12*b*, the second treatment liquid ejection head 14 is arranged at a position adjacent to the inkjet head 11*k* at the same interval as that of the plurality of inkjet heads 11*c*, 11*m*, 11*y*, and 11*k*. The first treatment liquid ejection head 13 in the treatment liquid ejection head 12*b* is arranged on an outer side of the second treatment liquid ejection head 14. An interval between the first treatment liquid ejection head 13 and the second treatment liquid ejection head 14 is made larger than the interval of the plurality of inkjet heads 11*c*, 11*m*, 11*y*, and 11*k*.

In this manner, the inkjet recording device 1 of this embodiment is provided with the two first treatment liquid ejection heads 13 and the two second treatment liquid ejection heads 14, and the first treatment liquid ejection heads 13 and the second treatment liquid ejection heads 14 are arranged on both sides of the inkjet unit 11 in the main scanning direction, respectively.

The first treatment liquid ejection head 13 ejects a first treatment liquid to the recording medium 3. The first treatment liquid in this embodiment is a liquid preferably ejected to the recording medium 3 before the ink is ejected to the recording medium 3, and is used as a pre-treatment liquid. For example, the first treatment liquid is a liquid containing a coagulant that coagulates ink containing pigment.

The second treatment liquid ejection head 14 ejects a second treatment liquid to the recording medium 3. The second treatment liquid in this embodiment is a liquid preferably ejected to the recording medium 3 after the ink is ejected to the recording medium 3, and is used as the post-treatment liquid. For example, the second treatment liquid is the liquid containing a resin dispersing agent obtained by dispersing a resin into a solution.

When the inkjet unit 11 moves in the main scanning direction, the two first treatment liquid ejection heads 13 and 13 mounted on the carriage 10 alternatively switch the head that ejects the first treatment liquid depending on whether the moving direction is forward or backward. For example, when the inkjet unit 11 moves in the forward direction illustrated in FIG. 10, the first treatment liquid ejection head 13 provided in the treatment liquid ejection head 12*a* ejects the first treatment liquid. As a result, during the movement in the forward direction, the first treatment liquid may be ejected to the recording medium 3 before the ink ejection by the inkjet heads 11*c*, 11*m*, 11*y*, and 11*k* is performed. For example, when the inkjet unit 11 moves in the backward direction illustrated in FIG. 10, the first treatment liquid ejection head 13 provided in the treatment liquid ejection head 12*b* ejects the first treatment liquid. As a result, during the movement in the backward direction, the first treatment liquid may be ejected to the recording medium 3 before the ink ejection by the inkjet heads 11*c*, 11*m*, 11*y*, and 11*k* is performed.

When the inkjet unit 11 moves in the main scanning direction, the two second treatment liquid ejection heads 14 and 14 mounted on the carriage 10 alternatively switch the head that ejects the second treatment liquid depending on whether the moving direction is forward or backward. For example, when the inkjet unit 11 moves in the forward direction illustrated in FIG. 10, the second treatment liquid ejection head 14 provided in the treatment liquid ejection head 12*b* ejects the second treatment liquid. As a result, during the movement in the forward direction, the second treatment liquid may be ejected to the recording medium 3 after the ink ejection by the inkjet heads 11*c*, 11*m*, 11*y*, and 11*k* is performed. For example, when the inkjet unit 11 moves in the backward direction illustrated in FIG. 10, the second treatment liquid ejection head 14 provided in the treatment liquid ejection head 12*a* ejects the second treatment liquid. As a result, during the movement in the backward direction, the second treatment liquid may be ejected to the recording medium 3 after the ink ejection by the inkjet heads 11*c*, 11*m*, 11*y*, and 11*k* is performed.

Figure 11A:
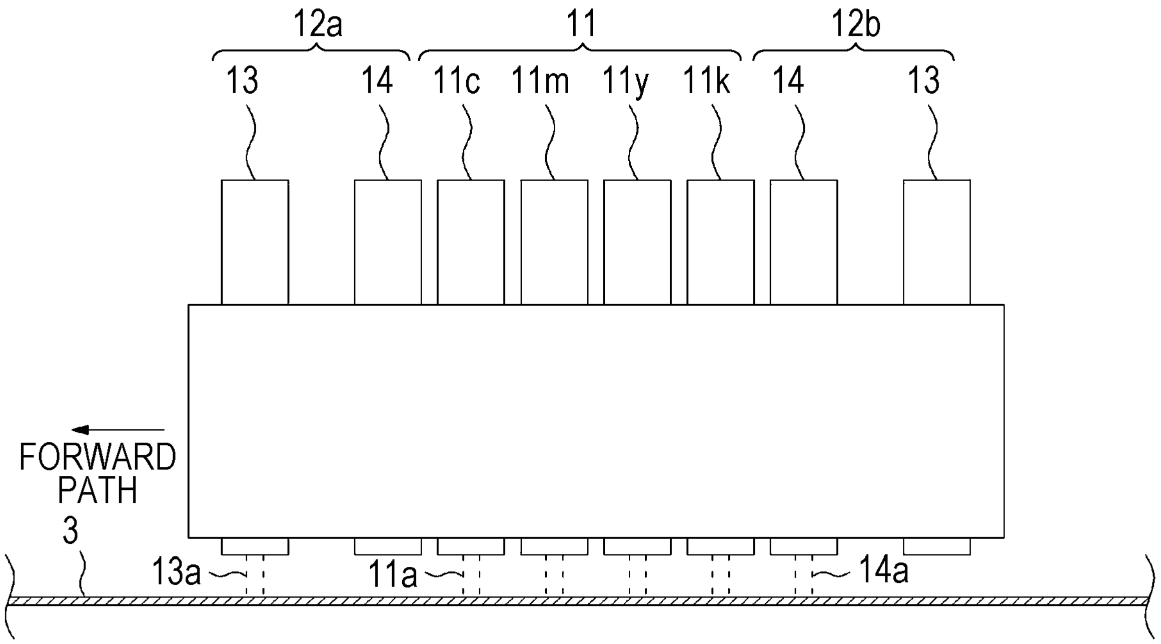
FIGS. 11A and 11B are views illustrating operations of the inkjet unit and the treatment liquid ejection head in the third embodiment.
Figure 11B:
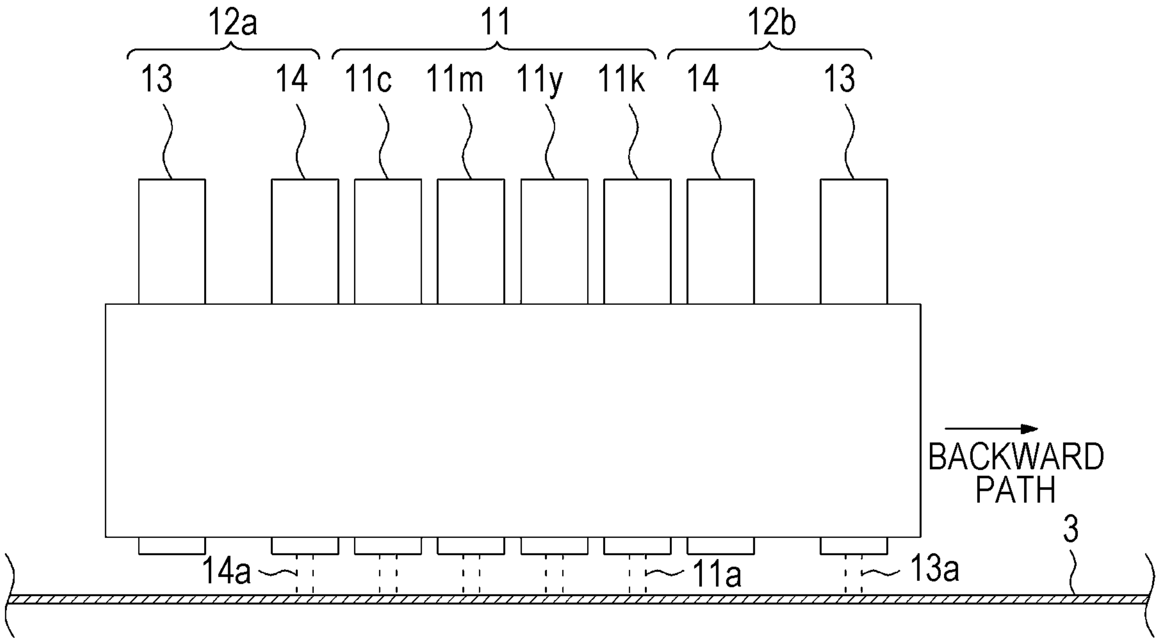

Next, FIGS. 11A and 11B are views illustrating operations of the inkjet unit 11 and the treatment liquid ejection heads 12*a* and 12*b* in the inkjet recording device 1 of this embodiment. First, FIG. 11A illustrates a case where the carriage 10 moves in the forward direction in the main scanning direction. When moving the carriage 10 in the forward direction in the main scanning direction, the control unit 30 drives the first treatment liquid ejection head 13 of the treatment liquid ejection head 12*a*, the inkjet heads 11*c*, 11*m*, 11*y*, and 11*k*, and the second treatment liquid ejection head 14 of the treatment liquid ejection head 12*b* to form an image on the recording medium 3. Specifically, the control unit 30 drives the first treatment liquid ejection head 13 of the treatment liquid ejection head 12*a* to eject a first treatment liquid 13*a* to the recording medium 3, then drives the inkjet heads 11*c*, 11*m*, 11*y*, and 11*k* to eject ink 11*a* to the recording medium 3, and then drives the second treatment liquid ejection head 14 of the treatment liquid ejection head 12*b* to eject a second treatment liquid 14*a* to the recording medium 3 while moving the carriage 10 in the forward direction. As a result, the first treatment liquid 13*a* may be ejected to the recording medium 3 before the ink 11*a* is ejected, and the second treatment liquid 14*a* may be ejected to the recording medium 3 after the ink 11*a* is ejected. Note that, when ejecting the first treatment liquid 13*a* and the second treatment liquid 14*a* to the recording medium 3, the control unit 30 drives the first treatment liquid ejection head 13 and the second treatment liquid ejection head 14 on the basis of image data to be printed as in the first embodiment.

FIG. 11B illustrates a case where the carriage 10 moves in the backward direction in the main scanning direction. When moving the carriage 10 in the backward direction in the main scanning direction, the control unit 30 drives the first treatment liquid ejection head 13 of the treatment liquid ejection head 12*b*, the inkjet heads 11*c*, 11*m*, 11*y*, and 11*k*, and the second treatment liquid ejection head 14 of the treatment liquid ejection head 12*a* to form the image on the recording medium 3. Specifically, the control unit 30 drives the first treatment liquid ejection head 13 of the treatment liquid ejection head 12*b* to eject the first treatment liquid 13*a* to the recording medium 3, then drives the inkjet heads 11*c*, 11*m*, 11*y*, and 11*k* to eject the ink 11*a* to the recording medium 3, and then drives the second treatment liquid ejection head 14 of the treatment liquid ejection head 12*a* to eject the second treatment liquid 14*a* to the recording medium 3 while moving the carriage 10 in the backward direction. As a result, the first treatment liquid 13*a* may be ejected to the recording medium 3 before the ink 11*a* is ejected, and the second treatment liquid 14*a* may be ejected to the recording medium 3 after the ink 11*a* is ejected. Note that, when ejecting the first treatment liquid 13*a* and the second treatment liquid 14*a* to the recording medium 3, the control unit 30 drives the first treatment liquid ejection head

13 and the second treatment liquid ejection head 14 on the basis of the image data to be printed as in the description above.

In this manner, the inkjet recording device 1 of this embodiment uses, as the first treatment liquid 13*a*, the pre-treatment liquid preferably ejected to the recording medium 3 before the ink is ejected to the recording medium 3, and uses, as the second treatment liquid 14*a*, the post-treatment liquid preferably ejected to the recording medium 3 after the ink is ejected to the recording medium 3. In the inkjet recording device 1, the two first treatment liquid ejection heads 13 and two second treatment liquid ejection heads 14 are mounted on the carriage 10. The two first treatment liquid ejection heads 13 and 13 are arranged on both sides of the inkjet unit 11 that ejects the ink in the main scanning direction. The two second treatment liquid ejection heads 14 and 14 are also arranged on both sides of the inkjet unit 11 that ejects the ink in the main scanning direction. The head that ejects the first treatment liquid 13*a* is alternatively switched between the two first treatment liquid ejection heads 13 and 13, and the head that ejects the second treatment liquid 14*a* is alternatively switched between the two second treatment liquid ejection heads 14 and 14 between when the carriage 10 moves in the forward direction and when this moves in the backward direction. Therefore, the inkjet recording device 1 of this embodiment may eject the first treatment liquid 13*a* to the recording medium 3 before the ink 11*a* is ejected to the recording medium 3 regardless of whether the carriage 10 is moved in the forward direction or the backward direction, and may eject the second treatment liquid 14*a* to the recording medium 3 after the ink 11*a* is ejected to the recording medium 3. As a result, the inkjet recording device 1 may form an image on the recording medium 3 on both forward path and backward path of the carriage 10, and productivity may be enhanced.

The inkjet recording device 1 is provided with a purge tub 6 and a cleaner 20 as described in the first embodiment. In the above-described configuration, the two first treatment liquid ejection heads 13 and 13 are arranged at outer positions away from the two second treatment liquid ejection heads 14 and 14, respectively, by a predetermined interval or more. Therefore, as for the purge tub 6, it is possible to separately provide a first purge tub 6*a* that recovers the ink and the second treatment liquid and second purge tubs 6*b* and 6*c* that recover the first treatment liquid at positions away from each other by a predetermined interval or more, and there is an advantage that the first treatment liquid may be prevented from adhering to other heads. As for the cleaner 20 also, it is possible to separately provide a first cleaner 24*a* that cleans the inkjet heads 11*c*, 11*m*, 11*y*, and 11*k* and the second treatment liquid ejection heads 14 and 14, and second cleaners 24*b* and 24*c* that clean the first treatment liquid ejection heads 13 and 13 at positions away from each other by a predetermined interval or more, and there is an advantage that the first treatment liquid may be prevented from adhering to other heads.

Note that, points other than those described above in this embodiment are similar to those described in the first embodiment.

Variation

Although the preferred embodiments of the present invention have been described above, the present invention is not limited to the above-described embodiments, and various variations may be applied.

For example, in the embodiment described above, the inkjet recording device 1 in which a plurality of inkjet heads 11*c*, 11*m*, 11*y*, and 11*k* is mounted on the carriage 10, the inkjet recording device 1 capable of forming a color image on the recording medium 3 is illustrated. However, the inkjet recording device 1 is not necessarily limited to a device capable of forming a color image. For example, the inkjet recording device 1 may be a dedicated monochrome machine.

In the embodiment described above, the example in which the first treatment liquid ejection head 13 provided at a position away from the inkjet unit 11 by a predetermined interval or more is mounted on the same carriage 10 as the inkjet unit 11 is described. However, the first treatment liquid ejection head 13 may also be mounted on a carriage different from the carriage 10 on which the inkjet unit 11 and the second treatment liquid ejection head 14 are mounted. In this case, the carriage on which the first treatment liquid ejection head 13 is mounted may be configured to move in the main scanning direction in synchronization with the carriage 10 on which the inkjet unit 11 and the second treatment liquid ejection head 14 are mounted.

In the embodiment described above, the case where the ink ejected by the inkjet heads 11*c*, 11*m*, 11*y*, and 11*k* is ink containing at least pigment is illustrated. However, the ink is not limited to the ink containing pigment. For example, the ink may also be dye ink.

In the embodiment described above, the example is described in which the cleaner 20 is provided with the cleaning rollers 23*a*, 23*b*, and 23*c*, and the ejection surface 110 of each head is cleaned by the cleaning rollers 23*a*, 23*b*, and 23*c*. However, a cleaning means provided in the cleaner 20 is not necessarily limited to the cleaning rollers 23*a*, 23*b*, and 23*c*. For example, as the cleaning means, a blade-shaped cleaning means formed of rubber and the like may be used, or a web-shaped cleaning means using non-woven fabric and the like may be used.

Although embodiments of the present invention have been described and illustrated in detail, the disclosed embodiments are made for purposes of illustration and example only and not limitation. The scope of the present invention should be interpreted by terms of the appended claims

What is claimed is:

1. An inkjet recording device comprising:

an inkjet unit that ejects ink to a recording medium while scanning in a main scanning direction;

a first treatment liquid ejection head that is arranged side by side with the inkjet unit in the main scanning direction, scans together with the inkjet unit, and ejects a first treatment liquid to the recording medium; and a second treatment liquid ejection head that is arranged side by side with the inkjet unit in the main scanning direction, scans together with the inkjet unit, and ejects a second treatment liquid different from the first treatment liquid to the recording medium, wherein at least one of the first treatment liquid ejection head and the second treatment liquid ejection head is arranged on both sides of the inkjet unit in the main scanning direction, and the main scanning direction is orthogonal to a conveyance direction of the recording medium.

2. The inkjet recording device according to claim 1, wherein the first treatment liquid is a treatment liquid ejected to the recording medium before the inkjet unit ejects the ink, and the first treatment liquid ejection head is arranged on both sides of the inkjet unit in the main scanning direction.

3. The inkjet recording device according to claim 2, wherein the inkjet unit ejects the ink to the recording medium on each of a forward path and a backward path in the main scanning direction, and the first treatment liquid ejection head arranged on both sides of the inkjet unit ejects the first treatment liquid to the recording medium before the inkjet unit ejects the ink by switching a head that ejects the first treatment liquid between the forward path and the backward path.

4. The inkjet recording device according to claim 2, wherein the second treatment liquid is a treatment liquid ejected to the recording medium before or after the inkjet unit ejects the ink.

5. The inkjet recording device according to claim 1, wherein the second treatment liquid is a treatment liquid ejected to the recording medium after the inkjet unit ejects the ink, and the second treatment liquid ejection head is arranged on both sides of the inkjet unit in the main scanning direction.

6. The inkjet recording device according to claim 5, wherein the inkjet unit ejects the ink to the recording medium on each of a forward path and a backward path in the main scanning direction, and the second treatment liquid ejection head arranged on both sides of the inkjet unit ejects the second treatment liquid to the recording medium after the inkjet unit ejects the ink by switching a head that ejects the second treatment liquid between the forward path and the backward path.

7. The inkjet recording device according to claim 5, wherein the first treatment liquid is a treatment liquid ejected to the recording medium before or after the inkjet unit ejects the ink.

8. The inkjet recording device according to claim 1, wherein the first treatment liquid is a treatment liquid ejected to the recording medium before the inkjet unit ejects the ink, the second treatment liquid is a treatment liquid ejected to the recording medium after the inkjet unit ejects the ink, and each of the first treatment liquid ejection head and the second treatment liquid ejection head is arranged on both sides of the inkjet unit in the main scanning direction.

9. The inkjet recording device according to claim 8, wherein the inkjet unit ejects the ink to the recording medium on each of a forward path and a backward path in the main scanning direction, the first treatment liquid ejection head arranged on both sides of the inkjet unit ejects the first treatment liquid to the recording medium before the inkjet unit ejects the ink by switching a head that ejects the first treatment liquid between the forward path and the backward path, and the second treatment liquid ejection head arranged on both sides of the inkjet unit ejects the second treatment liquid to the recording medium after the inkjet unit ejects the ink by switching a head that ejects the second treatment liquid between the forward path and the backward path.

10. The inkjet recording device according to claim 1, wherein the first treatment liquid contains a coagulant that coagulates the ink.

11. The inkjet recording device according to claim 10, wherein the first treatment liquid ejection head is arranged on an outer side of the inkjet unit than the second treatment liquid ejection head in the main scanning direction.

12. The inkjet recording device according to claim 1, wherein the second treatment liquid contains a resin dispersing agent obtained by dispersing a resin into a solution.

13. The inkjet recording device according to claim 1, wherein the ink at least contains pigment.

14. The inkjet recording device according to claim 1, wherein the inkjet unit is provided with a plurality of nozzles in a direction orthogonal to the main scanning direction, and the first treatment liquid ejection head and the second treatment liquid ejection head are provided with a plurality of nozzles at same positions as the plurality of nozzles in the direction orthogonal to the main scanning direction.

15. The inkjet recording device according to claim 1, wherein the first treatment liquid ejection head is arranged at a position away from the inkjet unit or the second treatment liquid ejection head by a predetermined interval or more.

16. The inkjet recording device according to claim 1, further comprising:

a first cleaner that cleans the inkjet unit; and a second cleaner that cleans the first treatment liquid ejection head.

17. The inkjet recording device according to claim 1, further comprising:

a first purge tub that recovers the ink purged and discharged from the inkjet unit; and a second purge tub that recovers the first treatment liquid purged and discharged from the first treatment liquid ejection head.

* * * * *